United States Patent
Yu et al.

(10) Patent No.: US 11,566,189 B2
(45) Date of Patent: Jan. 31, 2023

(54) PROCESS TO PRODUCE HIGH PARAFFINIC DIESEL

(71) Applicant: ExxonMobil Technology and Engineering Company, Annandale, NJ (US)

(72) Inventors: Xinrui Yu, Furlong, PA (US); Shifang Luo, Annandale, NJ (US); Xiaochun Xu, Basking Ridge, NJ (US); Randolph J. Smiley, Hellertown, PA (US)

(73) Assignee: EXXONMOBIL TECHNOLOGY AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 17/325,996

(22) Filed: May 20, 2021

(65) Prior Publication Data
US 2021/0363440 A1    Nov. 25, 2021

Related U.S. Application Data

(60) Provisional application No. 63/028,885, filed on May 22, 2020.

(51) Int. Cl.
*C10G 67/14* (2006.01)
*C10L 1/08* (2006.01)
(Continued)

(52) U.S. Cl.
CPC .............. *C10G 67/14* (2013.01); *B01D 3/06* (2013.01); *B01D 3/148* (2013.01); *C10L 1/08* (2013.01);
(Continued)

(58) Field of Classification Search
CPC .... B01D 3/06; B01D 3/148; C10G 2300/202; C10G 2300/307; C10G 2300/308; C10G 2300/4006; C10G 2300/4012; C10G 2300/4018; C10G 2400/02; C10G 2400/04; C10G 2400/06; C10G 2400/08;
(Continued)

(56) References Cited

U.S. PATENT DOCUMENTS

| 4,818,369 A | 4/1989 | Bortz |
| 2015/0175911 A1 | 6/2015 | Shih et al. |

(Continued)

FOREIGN PATENT DOCUMENTS

| EP | 0 251 433 A2 | 1/1988 |
| EP | 0752460 A1 * | 1/1997 |

(Continued)

OTHER PUBLICATIONS

International Search Report and Written Opinion received in PCT Application No. PCT/US2021/033587 dated Sep. 3, 2021, 12 pages.
(Continued)

*Primary Examiner* — Ellen M McAvoy
*Assistant Examiner* — Chantel L Graham
(74) *Attorney, Agent, or Firm* — Shook, Hardy & Bacon L.L.P.

(57) ABSTRACT

This disclosure relates to new processes to produce high paraffinic diesel from crude oil, such as tight oil from the
(Continued)

Permian basin. This disclosure also relates to high paraffinic diesel compositions and high paraffinic diesel blends.

24 Claims, 9 Drawing Sheets

(51) Int. Cl.
*C10G 65/08* (2006.01)
*B01D 3/06* (2006.01)
*B01D 3/14* (2006.01)

(52) U.S. Cl.
CPC . *C10G 2300/202* (2013.01); *C10G 2300/307* (2013.01); *C10G 2300/308* (2013.01); *C10G 2300/4006* (2013.01); *C10G 2300/4012* (2013.01); *C10G 2300/4018* (2013.01); *C10G 2400/04* (2013.01); *C10G 2400/08* (2013.01); *C10L 2200/043* (2013.01); *C10L 2200/0446* (2013.01); *C10L 2270/026* (2013.01); *C10L 2270/04* (2013.01); *C10L 2290/24* (2013.01); *C10L 2290/543* (2013.01)

(58) Field of Classification Search
CPC ...... C10G 65/043; C10G 65/08; C10G 67/14; C10L 1/08; C10L 2200/043; C10L 2200/0446; C10L 2270/026; C10L 2270/04; C10L 2290/24; C10L 2290/543
See application file for complete search history.

(56) References Cited

U.S. PATENT DOCUMENTS

| | | |
|---|---|---|
| 2016/0122664 A1 | 5/2016 | Thakkar |
| 2018/0142172 A1* | 5/2018 | Gosling ................. C10G 69/00 |
| 2018/0355264 A1 | 12/2018 | Brown et al. |

FOREIGN PATENT DOCUMENTS

| | | |
|---|---|---|
| EP | 0752460 A1 | 1/1997 |
| JP | H01305077 A | 11/1995 |
| WO | 2013/184545 A1 | 12/2013 |
| WO | 20180094336 A1 | 5/2018 |
| WO | WO-2018094336 A1 * | 5/2018 ............... B01D 3/10 |

OTHER PUBLICATIONS

International Search Report and Written Opinion received for PCT Application No. PCT/US2021/040230 dated Sep. 24, 2021, 12 pages.

Non-Final Office Action dated Jul. 22, 2022 in U.S. Appl. No. 17/364,989, 9 pages.

* cited by examiner

PROCESS TO PRODUCE HIGH PARAFFINIC DIESEL

CROSS-REFERENCE TO RELATED APPLICATIONS

This application claims the benefit of U.S. Provisional Application No. 63/028,885, filed on May 22, 2020, the entire contents of which are incorporated herein by reference.

FIELD

This application relates to a process for making high paraffinic diesel from whole crude oil.

BACKGROUND

In recent years, environmental regulations and development of engine design have resulted in an increasing demand for high grade diesel products, such as paraffinic diesel, in the European Union (EU) and North America. High grade diesel products provide cleaner burning transport diesel oil and decrease the amount of greenhouse emissions into the environment. The key characteristics of high grade paraffinic diesel include very low sulfur and aromatics contents, high Cetane number, etc. In the EU, the following specifications from EN 15940:2016 for cleaner burning transport diesel oil or high paraffinic diesel are provided in the table below:

| Properties | Unit | Limits Class A |
|---|---|---|
| Cetane Number | | ≥70 |
| Density at 15° C. | kg/L | 0.765 to 0.80 |
| Total aromatics content | wt % | ≤1.1 |
| Sulfur content | ppm | ≤5.0 |
| Carbon residue | wt % | ≤0.3 |

Paraffinic diesel fuels are liquid fuels that can be synthetically created from feedstocks such as natural gas (GTL), biomass (BTL) or coal (CTL); or through hydro-treatment of vegetable oils or animal fats (HVO). These high-quality fuels burn cleaner than conventional crude-oil based diesel fuels and are thus able to reduce local harmful emissions such as nitrogen oxides and particulate matter. However, synthetically created paraffinic diesel produced from gas-to-liquid (GTL), hydro-treated vegetable oil (HVO) and biomass-to-liquid (BTL) are restricted to the availability of feed stocks, have higher operational costs and higher $CO_2$ emissions.

Using conventional refinery process to produce high paraffinic diesel is challenging because of the extremely low sulfur, low aromaticity and high Cetane number specifications of high grade paraffinic diesel oil. To produce a diesel product which meets these specifications, crude oil needs to be processed with sophisticated and energy-intensive processes. There is a need to develop processes to produce high paraffinic diesel from other sources besides synthetic feedstocks. Processes to produce high paraffinic diesel from whole crude oil would have a lower cost and reduced $CO_2$ emissions as compared to synthetically created paraffinic diesel products.

SUMMARY

Methods of refining whole crude oil are disclosed. The first method of refining whole crude oil comprises:
(a) providing a hydrotreating reactor, a distillation tower, optionally an aromatic removal reactor and a whole crude oil stream;
(b) feeding the whole crude oil stream into the distillation tower to produce a plurality of streams comprising light ends stream, a naphtha stream, a kerosene stream, an atmospheric tower bottom stream and a diesel stream;
(c) feeding the diesel stream of step (b) into the hydrotreating reactor to produce a treated diesel stream; and
(d) processing the treated diesel stream to create one or more petroleum distillate streams.

The second method of refining whole crude oil comprises:
(a) providing a hydrotreating reactor, a distillation tower, an aromatics removal reactor, optionally a stacked catalyst bed and a whole crude oil stream.
(b) feeding the whole crude oil stream into the hydrotreating reactor to create a treated stream;
(c) feeding the treated stream into the distillation tower;
(d) processing the treated stream within the distillation tower to create a plurality of streams comprising light ends stream, a naphtha stream, a kerosene stream, a diesel stream and an atmospheric tower bottom stream;
(e) feeding the diesel stream into an aromatics removal reactor or a stacked catalyst bed to produce a lowered aromatics stream and
(f) processing the treated stream to create one or more petroleum distillate streams.

The third method of refining whole crude oil comprises:
(a) providing a hydrotreating reactor, a distillation tower, a flash evaporation separator, an aromatics removal reactor and a whole crude oil stream;
(b) feeding the whole crude oil stream into the flash evaporation separator to create a plurality of streams comprising a light ends stream, a naphtha stream and a kerosene plus stream;
(c) feeding the kerosene plus stream into the hydrotreating reactor to create a treated stream;
(d) feeding the treated stream into the distillation tower.
(e) processing the treated stream within the distillation tower to create a plurality of streams comprising a light ends stream, a naphtha stream, a kerosene stream, an atmospheric tower bottom stream and a diesel stream;
(f) optionally dewaxing the diesel stream before feeding the diesel stream into an aromatics removal reactor or a stacked catalyst bed;
(g) feeding the diesel stream into an aromatics removal reactor or a stacked catalyst bed to produce a lowered aromatics diesel stream and
(h) processing the lowered aromatics diesel stream to create one or more petroleum distillate streams.

The fourth method of refining whole crude oil comprises:
(a) providing a hydrotreating reactor, a distillation tower, an aromatic removal reactor and a whole crude oil stream;
(b) reduction of the aromatic content in the crude oil with an aromatic removal reactor or a stacked catalyst bed to create a lowered aromatics crude oil stream:
(c) optionally processing the lowered aromatics crude oil stream using hydrotreatment process;
(d) feeding the processed crude stream into a distillation tower to create a plurality of streams comprising a light ends stream, a naphtha stream, a kerosene stream, a diesel stream and an atmospheric tower bottom stream; and (e) processing the diesel stream to create one or more petroleum distillate streams.

The fifth method of refining whole crude oil comprises:
(a) providing a hydrotreating reactor, a distillation tower, optionally an aromatic removal reactor and a whole crude oil stream;
(b) feeding the whole crude oil stream into the distillation tower to produce a plurality of streams comprising light ends stream, a naphtha stream, a kerosene stream, a diesel stream and an atmospheric tower bottom stream;
(c) feeding the diesel stream of step (b) into the hydrotreating reactor to produce a treated diesel stream;
(d) dewaxing the treated diesel stream to produce a dewaxed diesel stream; and
(e) processing the dewaxed diesel stream to create one or more petroleum distillate streams.

The sixth method of refining whole crude oil comprises:
(a) blending a petroleum distillate stream and a petroleum distillate stream from one of the methods of refining whole crude oil described above;
(b) processing the blended diesel stream using an aromatic removal process to lower the aromatics content;
(c) optionally processing the stream using a hydrotreatment process or de-waxing process and
(d) processing the diesel stream to create a high paraffinic diesel product.

A process for preparing a high paraffinic diesel product is also disclosed. The process for preparing a high paraffinic diesel product comprises:
(a) blending a petroleum distillate stream and a petroleum distillate stream prepared from a method of refining whole crude oil of the present invention;
(b) processing the blended diesel stream using an aromatic removal process to lower the aromatics content;
(c) optionally processing the stream using a hydrotreatment process or de-waxing process and
(d) processing the diesel stream to create a high paraffinic diesel product.

BRIEF DESCRIPTION OF THE FIGURES

For a better understanding of the nature, objects, and processes involved in this disclosure, reference should be made to the detailed description taken in conjunction with the accompanying figures. The subject matter disclosed is capable of considerable modifications, alterations, combinations, and equivalents in form and function, as will occur to those skilled in the art and having the benefit of this disclosure.

DETAILED DESCRIPTION

Figure 1:
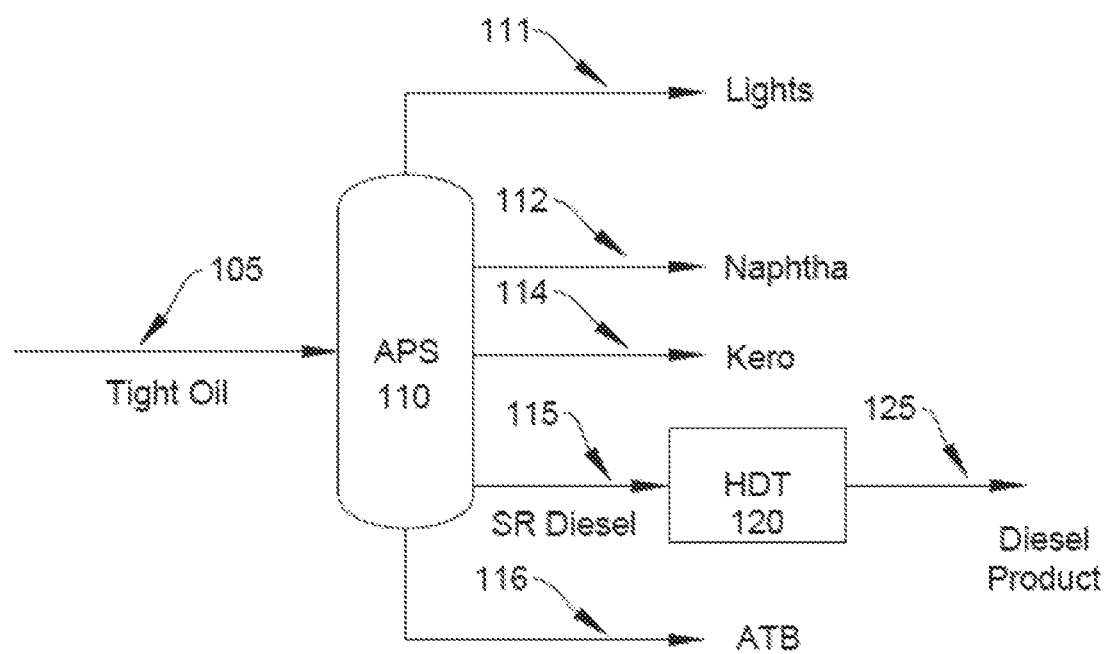
FIG. 1 illustrates a whole crude hydrotreating process flow, where straight diesel is processed using a hydroprocessing reactor to produce a high paraffinic diesel product.

As used herein, "wt" means percentage by weight, "vol %" means percentage by volume, "mol %" means percentage by mole, "ppm" means parts per million. All "ppm" as used herein are ppm by weight unless specified otherwise. All concentrations herein are expressed on the basis of the total amount of the composition in question. All ranges expressed herein should include both end points as two specific embodiments unless specified or indicated to the contrary.

As used herein, the term "Cetane Number" (as determined by ASTM D7668) is a number that reflects the ignition quality of a diesel fuel. Mixtures of n-hexadecane have a Cetane Number of 100. ASTM D7668 refers to the ASTM method titled "Standard Test Method for Determination of Derived Cetane Number (DCN) of Diesel Fuel Oils-Ignition Delay and Combustion Delay Using a Constant Volume Combustion Chamber Method."

As used herein, the term "Cetane Index" is a number which corresponds to a cetane number measurement and provides a means for estimating the ASTM cetane number of distillate fuels. The Calculated Cetane Index (as determined by ASTM D4737) is useful for estimating ASTM cetane number when a test engine is not available for determining the cetane number. ASTM D4737 refers to the ASTM method titled "Standard Test Method for Calculated Cetane Index by Four Variable Equation."

As used herein. "feedstock" and "feed" (and grammatical derivatives thereof) are used interchangeably and both refer to a composition that is fed into a reactor. A feedstock may optionally have been pre-treated to modify its disposition.

As used herein, the term "hydrocarbon" means a class of compounds containing hydrogen bound to carbon, and encompasses (i) saturated hydrocarbon, (ii) unsaturated hydrocarbon, (iii) mixtures of hydrocarbons, and including mixtures of hydrocarbon compounds (saturated and/or unsaturated) having different values of n.

As used herein, the term "hydrotreating" is used as a general process term for removing sulfur (and nitrogen and oxygen) from organic sulfur, nitrogen and oxygen compounds from petroleum feedstocks. The hetero compounds are transformed into $H_2S$, $NH_3$ and $H_2O$, respectively, after hydrotreatment. As used herein, term "hydrotreating" encompasses hydrodesulfuriztation (HDS), hydrodenitrogation (HDN) and hydrodeoxygenation (HDO).

As used herein, the term "kerosene plus stream," "kerosene+ stream" or "kero+" comprises kerosene and the remaining heavy fractions of the whole crude tight oil stream.

As used herein, the term "reactor," and grammatical derivatives thereof, refers to a vessel comprising one or more catalyst beds.

As used herein, treatment in an aromatic removal reactor to produce "a lowered aromatics diesel stream" means any method that reduces or lowers the aromatic content of a diesel stream. Saturation of the diesel stream with hydrogen is one way to lower the aromatic content of the diesel stream. Another way to lower the aromatic content of the diesel stream is by feeding the diesel stream into a stacked catalyst bed to produce a lowered aromatics stream. Other methods known in an to lower the aromatic content of a diesel stream are encompassed by the term producing "a lowered aromatics diesel stream."

As used herein, the term "whole crude hydrotreating" means the crude oil is hydro-processed first and then separated into different streams in a distillation tower.

As used herein, the term "whole crude wide cut hydrotreating" means the whole crude petroleum oil is first flash separated and hydrotreated before distillation. As used herein, the terms "flashing," "flash separator" and "flash evaporation" are used as a general process term descriptive of the process of removing components of crude oil via heating and/or depressurization that results in vaporizing volatile components from the liquid state.

In recent years, environmental regulations and development of engine design have resulted in an increasing demand for high grade diesel products, such as, paraffinic diesel, especially in the European Union (EU) and North America. High grade paraffinic diesel must include low sulfur and aromatics contents, high Cetane number, etc. In the EU, the following specifications from EN 15940:2016 for cleaner burning transport diesel oil or high paraffinic diesel are provided in the table below:

| Properties | Unit | Limits Class A |
|---|---|---|
| Cetane Number | | ≥70 |
| Density at 15° C. | kg/L | 0.765 to 0.80 |
| Total aromatics content | wt % | ≤1.1 |
| Sulfur content | ppm | ≤5.0 |
| Carbon residue | wt % | ≤0.3 |

A lesser cost and reduced energy intensive process to obtain paraffinic diesel may be in preparing it from whole crude oil. Tight oil, also known as shale oil, is crude oil found in low-permeable shale rock formations. It is a light sweet crude oil with a low heteroatom content. Development of hydraulic fracturing and horizontal well drilling technologies has significantly increased the supply of tight oil available for refining. Refining tight oil in process flows originally developed for conventional crude oil may be inefficient.

Using conventional refinery process to produce high paraffinic diesel is challenging because of the extremely low sulfur, low aromaticity and high Cetane number specifications. To produce diesel which meets these specifications, crude oil needs to be processed with sophisticated and energy-intensive processes. Alternative processes include gas-to-liquid (GTL), hydro-treated vegetable oil (HVO) and biomass-to-liquid (BTL), etc. The productions of these alternative processes are restricted to the availability of feed stocks.

The present invention discloses new processes designed to produce high paraffinic diesel from high saturates crude oil, such as tight oil or shale oil from the Permian basin. The feed stock crudes have high saturates (~90 wt % paraffins and naphthenes) and low sulfur content (<5 ppm). The normal boiling range for diesel product is about 530 to about 7M) F. Depending on the whole crude properties, the diesel product can be produced from a straight-run diesel stream from a separation unit or a hydro-treated diesel. The diesel stream is then processed using an aromatic removal process, which can be either a separate reactor or a stacked catalyst bed, in which the aromatic compounds are convened to naphthenic products by a hydrogen saturation reaction. Additional processes, such as dewaxing, can also be applied before or after the aromatic removal process to improve the cold flow properties. Both model and experimental data showed the diesel product could meet the high cetane (>70), low sulfur (<5 ppm) and low aromaticity (<1 wt %) specifications of high paraffinic diesel products.

The present invention provides an economical process to produce high paraffinic diesel from high saturates crude oil, such as Permian crude oil and other tight oils. This process can produce high paraffinic diesel at relatively low cost with a reduced $CO_2$ emission footprint. At least eight processes are described for refining crude oil to produce high paraffinic diesel products.

Distillation Process

The Atmospheric Distillation Unit is typically the first processing unit in a crude oil refining process. The Atmospheric Distillation Unit separates the liquid and gases according to their weight and boiling point. Heavy fractions, such as an atmospheric tower bottom fraction, are on the bottom of the distillation tower, and light fractions, such as the $C_{1-4}$ hydrocarbon gases, are on the top. The lightest fractions vaporize and rise to the top of the distillation tower, where they condense back to liquids. Medium weight liquids, including kerosene and diesel oil distillates, stay in the middle of the distillation tower. Heavier liquids separate lower down in the distillation tower, while the heaviest fractions with the highest boiling points settle at the bottom of the tower. The bottom stream of the distillation tower is called the atmospheric tower bottom stream.

Typically, a whole crude tight oil stream is processed through an atmospheric distillation tower producing multiple petroleum distillate streams. Among these distillate streams, separated by boiling point, are a light ends stream, a naphtha stream, a kerosene stream, a diesel stream and an atmospheric tower bottom stream. The atmospheric distillation tower distills and separates the incoming crude oil into various fractions of different boiling ranges. A light ends stream comprises $C_{1-4}$ hydrocarbons which have a boiling point of less than 100° F. Preferably, the boiling point cutoff of the light ends stream is about 96° F. A naphtha stream comprises $C_{8-12}$ hydrocarbons which have a boiling point from about 110 to about 350° F. A kerosene stream comprises $C_{12-30}$ hydrocarbons which have a boiling point from about 350 to about 480° F. A diesel stream comprises $C_{14-20}$ hydrocarbons which have a boiling point at about 480 to about 700° F. An atmospheric tower bottom stream comprises $C_{50-100+}$ hydrocarbons which have a boiling point greater than 700° F.

Table 1 below discloses exemplary bulk properties for the feed stock crude oil useful for the present invention. Two exemplary shale oils are described below.

|  | Unit | Tight oil-1 | Tight oil-2 |
|---|---|---|---|
| API | degrees | 48.4 | 47.8 |
| Paraffins | wt % | 50.44 | 49.41 |
| Naphthenes | wt % | 41.03 | 42.86 |
| Aromatics | wt % | 8.47 | 7.67 |
| Total sulfur | ppm | 84 | 124 |
| Aliphatic Sulfur | ppm | 30 | 55 |
| Nitrogen | ppm | 15.8 | 52 |
| Basic Nitrogen | ppm | 6.2 | 15 |
| SIMDIS (ASTM D2887) | | | |
| 5 wt % | | 96.2 | 118.7 |
| 10 wt % | | 155 | 176.8 |
| 20 wt % | | 213.5 | 244.4 |
| 30 wt % | | 258 | 289.7 |
| 50 wt % | | 410.8 | 434 |
| 70 wt % | | 589.9 | 601.1 |
| 80 wt % | | 694.7 | 704.1 |
| 90 wt % | | 830.6 | 856.8 |
| 95 wt % | | 941.6 | 962.2 |
| 99.5 wt % | | 1097.7 | 1107.9 |

Typically, crude oil is characterized by its API gravity. The higher the API, the lighter the crude. Oil having an API gravity above 34° is considered light sweet crude. Oil having an API gravity above 31.1° is considered light crude. Oil having an API gravity between 24 to 34° is considered medium sour crude. Oil having an API gravity less than 24° is considered heavy sour crude.

ASTM 02887 was used to further characterize the tight oil feed stocks. ASTM D2887 refers to the ASTM method titled "Standard Test Method For Boiling Range Distribution Of Petroleum Fractions By Gas Chromatography," such that the numbers above refer to the fact that 5% of the tight oil boils at temperatures above 96.2° F. and 95% of the tight oil boils by 941.6° F.

In one embodiment, the crude oil used in the methods of the present invention is tight oil, Permian crude oil or shale oil. In another embodiment, the crude oil is tight oil. In a further embodiment, the crude oil is Permian crude oil. In another embodiment, the crude oil is shale oil.

In one embodiment, the crude oil has a total paraffin and naphthenes content of greater than 50 we %. In a further embodiment, the crude oil is at least 85 wt % paraffin and naphthenes. In a further embodiment, the crude oil is at least 90 wt % paraffin and naphthenes.

In another embodiment, the crude oil has a naphthenes content ranging from about 20 to about 60 wt %. In a further embodiment, the crude oil has a naphthenes content ranging from about 35 to about 50 wt %.

In another embodiment, the crude oil used in the methods of the present invention has a paraffins content ranging from about 20 to about 80 wt %. In a further embodiment, the crude oil used in the methods of the present invention has a paraffins content ranging from about 45 to about 55 wt %.

In another embodiment, the crude oil used in the methods of the present invention has an aromatics content ranging from about 5 to about 50 wt %. In a further embodiment, the crude oil used in the methods of the present invention has an aromatics content ranging from about 5 to about 10 wt %.

In another embodiment, the crude oil used in the methods of the present invention has a sulfur content ranging from about 10 to about 4000 ppm. In a further embodiment, the crude oil used in the methods of the present invention has a sulfur content ranging from about 20 to about 70 ppm.

In another embodiment, the crude oil used in the methods of the present invention has a nitrogen content ranging from about 5 to about 800 ppm. In a further embodiment, the crude oil used in the methods of the present invention has a nitrogen content ranging from about 5 to about 60 ppm. In a further embodiment, the crude oil used in the methods of the present invention has a nitrogen content ranging from about 10 to about 60 ppm.

In another embodiment, the crude oil used in the methods of the present invention has a basic nitrogen content ranging from about 5 to about 20 ppm.

HydroTreatment

In one embodiment, a method of refining whole crude oil comprises:
(a) providing a hydrotreating reactor, a distillation tower, optionally an aromatics removal reactor and a whole crude oil stream;
(b) feeding the whole crude oil stream into the distillation tower to produce a plurality of streams comprising light ends stream, a naphtha stream, a kerosene stream, a diesel stream and an atmospheric tower bottom stream;
(c) feeding the diesel stream of step (b) into the hydrotreating reactor to produce a treated diesel stream; and
(d) processing the treated diesel stream to create one or more petroleum distillate streams.

As used herein, the term "hydrotreating" is used as a general process term for removing sulfur (and nitrogen and oxygen) from organic sulfur, nitrogen and oxygen compounds from petroleum feedstocks. The hetero compounds are transformed into $H_2S$, $NH_3$ and $H_2O$, respectively, after hydrotreatment. As used herein, term "hydrotreating" encompasses hydrodesulfurization (HDS), hydrodenitrogation (HDN) and hydrodeoxygenation (HDO).

Hydrotreatment is typically used to reduce the sulfur, nitrogen, and aromatic content of a feed. The catalysts used for hydrotreatment can include conventional hydroprocessing catalysts, such as those that comprise at least one Group VIII non-noble metal (Columns 8-10 of IUPAC periodic table), preferably Fe, Co, and/or Ni, such as Co and/or Ni; and at least one Group VIB metal (Column 6 of IUPAC periodic table), preferably Mo and/or W. Such hydroprocessing catalysts can optionally include transition metal sulfides. These metals or mixtures of metals are typically present as oxides or sulfides on refractory metal oxide supports. Suitable metal oxide supports include low acidic oxides such as silica, alumina, titania, silica-titania, and titania-alumina. Suitable aluminas are porous aluminas such as gamma or eta having average pore sizes from 50 to 200 Å, or 75 to 150 Å; a surface area from 100 to 300 $m^2/g$, or 150 to 250 $m^2/g$; and a pore volume of from 0.25 to 1.0 $cm^3/g$, or 0.35 to 0.8 $cm^3/g$. The supports are preferably not promoted with a halogen such as fluorine as this generally increases the acidity of the support.

The at least one Group VIII non-noble metal, in oxide form, can typically be present in an amount ranging from about 2 wt % to about 40 wt %, preferably from about 4 wt % to about 15 wt %. The at least one Group VIB metal, in oxide form, can typically be present in an amount ranging from about 2 wt % to about 70 wt %, preferably for supported catalysts from about 6 wt % to about 40 wt % or from about 10 wt % to about 30 wt %. These weight percents are based on the total weight of the catalyst. Suitable metal catalysts include cobalt/molybdenum (1-10% Co as oxide, 10-40% Mo as oxide), nickel/molybdenum (1-10% Ni as oxide, 10-40% Co as oxide), or nickel/tungsten (1-10% Ni as oxide, 10-40% W as oxide) on alumina, silica, silica-alumina, or titania.

Alternatively, the hydrotreating catalyst can be a bulk metal catalyst, or a combination of stacked beds of supported and bulk metal catalyst. By bulk metal, it is meant that the catalysts are unsupported wherein the bulk catalyst particles comprise 30-100 wt. % of at least one Group VIII non-noble metal and at least one Group VIB metal, based on the total weight of the bulk catalyst particles, calculated as metal oxides and wherein the bulk catalyst particles have a surface area of at least 10 m²/g. It is furthermore preferred that the bulk metal hydrotreating catalysts used herein comprise about 50 to about 100 wt %, and even more preferably about 70 to about 100 wt %, of at least one Group VIII non-noble metal and at least one Group VIB metal, based on the total weight of the particles, calculated as metal oxides.

Bulk catalyst compositions comprising one Group VIII non-noble metal and two Group VIB metals are preferred. It has been found that in this case, the bulk catalyst particles are sintering-resistant. Thus the active surface area of the bulk catalyst particles is maintained during use. The molar ratio of Group VIB to Group VIII non-noble metals ranges generally from 10:1-1:10 and preferably from 3:1-1:3. In the case of a core-shell structured particle, these ratios of course apply the metals contained in the shell. If more than one Group VIB metal is contained in the bulk catalyst particles, the ratio of the different Group VIB metals is generally not critical. The same holds when more than one Group VIII non-noble metal is applied. In the case where molybdenum and tungsten are present as Group VIB metals, the molybdenum:tungsten ratio preferably lies in the range of 9:1-1:9. Preferably the Group VIII non-noble metal comprises nickel and/or cobalt. It is further preferred that the Group VIB metal comprises a combination of molybdenum and tungsten. Preferably, combinations of nickel/molybdenum/tungsten and cobalt/molybdenum/tungsten and nickel/cobalt/molybdenum/tungsten are used. These types of precipitates appear to be sinter-resistant. Thus, the active surface area of the precipitate is maintained during use. The metals are preferably present as oxidic compounds of the corresponding metals, or if the catalyst composition has been sulfided, sulfidic compounds of the corresponding metals.

It is also preferred that the bulk metal hydrotreating catalysts used herein have a surface area of at least 50 m²/g and more preferably of at least 100 m²/g. It is also desired that the pore size distribution of the bulk metal hydrotreating catalysts be approximately the same as the one of conventional hydrotreating catalysts. Bulk metal hydrotreating catalysts have a pore volume of 0.05-5 ml/g, or of 0.1-4 ml/g, or of 0.1-3 mL/g, or of 0.1-2 ml/g determined by nitrogen adsorption. Preferably, pores smaller than 1 nm are not present. The bulk metal hydrotreating catalysts can have a median diameter of at least 100 nm. The bulk metal hydrotreating catalysts can have a median diameter of not more than 5000 µm, or not more than 3000 µm. In an embodiment, the median particle diameter lies in the range of 0.1-50 µm and most preferably in the range of 0.5-50 µm.

The hydrotreatment is carried out in the presence of hydrogen. A hydrogen stream is, therefore, fed or injected into a vessel or reaction zone or hydroprocessing zone in which the hydroprocessing catalyst is located. Hydrogen, which is contained in a hydrogen containing "treat gas," is provided to the reaction zone. Treat gas, as referred to in this invention, can be either pure hydrogen or a hydrogen-containing gas, which is a gas stream containing hydrogen in an amount that is sufficient for the intended reaction(s), optionally including one or more other gasses (e.g., nitrogen and light hydrocarbons such as methane), and which will not adversely interfere with or affect either the reactions or the products. Impurities, such as $H_2S$ and $NH_3$ are undesirable and would typically be removed from the treat gas before it is conducted to the reactor. The treat gas stream introduced into a reaction stage will preferably contain at least about 50 vol. % and more preferably at least about 75 vol. % hydrogen.

Hydrotreating conditions can include temperatures of about 200° C. to about 450° C., or about 315° C. to about 425° C.; pressures of about 250 psig (1.8 MPag) to about 5000 psig (34.6 MPag) or about 300 psig (2.1 MPag) to about 3000 psig (20.8 MPag); liquid hourly space velocities (LHSV) of about 0.1 $hr^{-1}$ to about 10 $hr^{-1}$; and hydrogen treat gas rates of about 200 scf/B (35.6 m³/m³) to about 10,000 scf/B (1781 m³/m³), or about 500 (89 m³/m³) to about 10,000 scf/B (1781 m³/m³).

The temperature of the hydrotreatment reactor is suitably maintained from about 400° F. to about 850° F., or from about 500° F. to about 800° F., with the exact selection dependent on the desulfurization desired for a given feed and catalyst. In one embodiment, the temperature at the hydrotreatment reactor is about 500° F. to about 800° F. In a further embodiment, the temperature at the hydrotreatment reactor is about 600 to about 700° F. Because the hydrogenation reactions that take place in this step are exothermic, a rise in temperature takes place along the reactor.

The pressure of the hydrogen in the hydrotreatment reactor is suitably maintained from about 600 to about 1000 psig. The liquid hourly space velocity (LHSV) of the hydrogen gas is about 0.2 to about 1.4 $hr^{-1}$. The purity of the hydrogen gas is at least 80%, preferably about 85%. The hydrogen treat gas to hydrocarbon gas ratio is about 1000 to about 6000 standard cubic feet per barrel (scf/B). Preferably, the hydrogen treat gas:hydrocarbon gas ratio is about 1000) to about 5000 standard cubic feet per barrel (scf/B). The catalyst in the hydrotreatment reactor is preferably a cobalt-molybdenum catalyst. In one embodiment, the hydrotreatment catalyst is a CoMo catalyst.

In one embodiment, the pressure of the hydrotreatment reactor is about 600 to about 1200 psig. In a further embodiment, the pressure of the hydrotreatment reactor is about 800 to 1000 psig. In a further embodiment, the pressure of the hydrotreatment reactor is about 900 psig.

One application of a hydrotreatment process is schematically illustrated in FIG. 1. A whole crude tight oil hydrotreating process flow 105 for low heteroatom content petroleum is illustrated. After flowing through an Atmospheric Distillation Unit 110, the whole crude tight oil petroleum stream 105 is separated into a plurality of petroleum distillate streams including a light ends stream (lights) 111, a naphtha stream 112, a kerosene stream (kero) 114, a straight run diesel stream (SR diesel) 115 and an atmospheric tower bottom stream (ATB) 116. These petroleum distillate streams are separated by boiling point. The light ends stream comprising $C_{1-4}$ hydrocarbons have a boiling point cutoff of about 96° F. The naphtha stream comprising $C_{8-12}$ hydrocarbons have a boiling point from about 96 to about 350'F. The kerosene stream comprising $C_{12-30}$ hydrocarbons have a boiling point from about 350 to about 480° F. The diesel stream comprising $C_{14-20}$ hydrocarbons have a boiling point from about 480 to about 700° F. The atmospheric tower bottom stream comprising $C_{50-100+}$ hydrocarbons have a boiling point greater than 700° F.

The straight run diesel stream 115 of FIG. 1 is then processed in a hydrotreatment reactor 120 to create a petroleum distillate stream 125.

Exemplary reaction conditions for the process of FIG. 1 in the hydrotreating reactor are: a temperature of about 600-700° F., a hydrogen pressure of about 800-1000 PSIG with a hydrogen purity of about 80-90%, about 0.2-0.5 hr$^{-1}$ LHSV, hydrogen treat gas:hydrocarbon ratio of about 400-5000:1 standard cubic feet per barrel (scf/B) and a cobalt-molybdenum catalyst.

The hydrogen purity at the inlet of the HDT reactor ranged from about 81.3 to about 81.4 vol %. The hydrogen purity at the outlet of the HDT reactor ranged from about 80.0 to 81.0 vol %. The hydrogen partial pressure is about 700-750 psig. The upper limit of the hydrogen and hydrocarbon gases ranges from about 900 to 950 psig. The lower limit of the hydrogen and hydrocarbon gases ranges from about 480-550 psig.

If the partial pressure of hydrogen is high in HDT reactor, the majority of aromatics components in SR diesel can be saturated in HDT reactor, which makes the treated diesel product have a lowered aromatic content. Preferably, the partial pressure of hydrogen ranges from about 500 PSIG to about 950 PSIG in the HDT reactor.

The treated SR diesel stream according to the process of FIG. 1 resulted in petroleum diesel products with the following exemplary properties. The bulk properties of the Tight oil-1 and Tight oil-2 feeds are as described in Table 1.

|  | Unit | Tight oil-1 as feed | Tight oil-2 as feed |
|---|---|---|---|
| API gravity | degree | 41.5 | 41.6 |
| Total Sulfur | ppm | <0.1 | <0.1 |
| Nitrogen | ppm | <0.1 | <0.1 |
| Total aromatics | wt % | 0.9 | 0.9 |
| Total paraffins | wt % | 46.5 | 45.4 |
| Total naphthenes | wt % | 52.6 | 53.7 |
| Cetane Index (ASTM D4737) |  | 71 | 71 |
| Carbon residue | wt % | <0.1 | <0.1 |

ASTM D4737 is used to determine the Cetane Index of the petroleum distillate product. ASTM D4737 refers to the method titled "Standard Test Method for Calculated Cetane Index by Four Variable Equation." The Calculated Cetane index by Four Variable Equation is a tool for estimating cetane number of a petroleum distillate product.

In one embodiment, the one or more petroleum distillate streams of the method of refining whole crude oil is a high paraffinic diesel product.

In another embodiment, the petroleum distillate stream end product in the method of refining crude oil has a total paraffins content ranging from about 35 to about 55 wt %. In a further embodiment, the total paraffins content ranges from about 35 to about 50 wt %.

In another embodiment, the petroleum distillate stream end product has a total naphthenes content ranging from about 50 to about 70 wt %. In a further embodiment, the petroleum distillate stream end product has a naphthenes content ranging from about 50 to about 60 wt %.

In another embodiment, the high paraffinic diesel product has a total aromatics content of less than 1.1 weight percent. In a further embodiment, the petroleum distillate stream end product has a total aromatics content of less than 1 wt %.

In another embodiment, the high paraffinic diesel product has a sulfur content of less than 5 ppm. In a further embodiment, the petroleum distillate stream end product has a total sulfur content of less than 1 ppm. In a further embodiment, the petroleum distillate stream end product has a total sulfur content of less than 0.1 ppm.

In another embodiment, the petroleum distillate stream end product has a nitrogen content of less than 1 ppm. In a further embodiment, the petroleum distillate stream end product has a nitrogen content of less than 0.1 ppm.

In another embodiment, the high paraffinic diesel product has a carbon residue content of less than or equal to 0.3 weight percent. In a further embodiment, the high paraffinic diesel product has a carbon residue content of less than 0.1 weight percent.

In another embodiment, the high paraffinic diesel product has a Cetane Index greater than or equal to 70.

In another embodiment, the high paraffinic diesel product has a Cetane number greater than or equal to 70. If needed, the high paraffinic diesel product may contain a cetane improver to raise the Cetane number of the high paraffinic diesel product to at least 70.

In another embodiment, the diesel stream of step (c) comprises the diesel and kerosene streams of step (b). In another embodiment, the diesel stream comprises the diesel and kerosene streams from the distillation tower. In a further embodiment, the diesel stream comprising the diesel and kerosene streams of step (b) has a boiling point of about 350 to about 700° F. In a further embodiment, the diesel stream comprising the diesel and kerosene streams of step (b) has a boiling point of about 350 to about 600° F., about 400 to about 700° F. or about 450 to about 700° F.

HydroTreatment and Aromatic Removal

In another embodiment, the diesel stream after hydrotreatment is further treated in an aromatic removal reactor to produce a diesel stream with a lowered aromatics content. The purpose of this process step is to lower the aromatic content of the diesel stream. Saturation of the diesel stream with hydrogen is one way to lower the aromatic content of the diesel stream. Another way to lower the aromatic content of the diesel stream is by feeding the diesel stream into stacked catalyst bed to produce a lowered aromatics stream. Other methods known in art to lower the aromatic content of a diesel stream are encompassed by the term producing "a lowered aromatics diesel stream." As used herein, the term "produce a lowered aromatics diesel stream" means any method that reduces or lowers the aromatic content of a diesel stream.

In one embodiment, a method of refining whole crude oil comprises:
(a) providing a hydrotreating reactor, a distillation tower, an aromatic removal reactor and a whole crude oil stream;
(b) feeding the whole crude oil stream into the distillation tower to produce a plurality of streams comprising light ends stream, a naphtha stream, a diesel stream, a kerosene stream, and an atmospheric tower bottom stream;
(c) feeding the diesel stream of step (b) into the hydrotreating reactor to produce a treated diesel stream;
(d) feeding the treated diesel stream into an aromatic removal reactor or a stacked catalyst bed to produce a lowered aromatics diesel stream; and
(e) processing the further treated diesel stream to create one or more petroleum distillate streams. To lower the aromatic content of a diesel stream, the diesel stream is saturated with hydrogen to reduce its aromatic hydrocarbon content. In one embodiment, the conditions of the aromatic removal process are: temperature of about 400 to about 700° F. pressure of about 500 to about 700 psig, about 0.5 hr$^{-1}$ to about 2 liquid hourly space velocity (LHSV), hydrogen treat gas:hydrocarbon ratio of about 1000-2000:1 standard cubic feet per barrel (scf/B) and a Pt/Pd catalyst.

Figure 2:
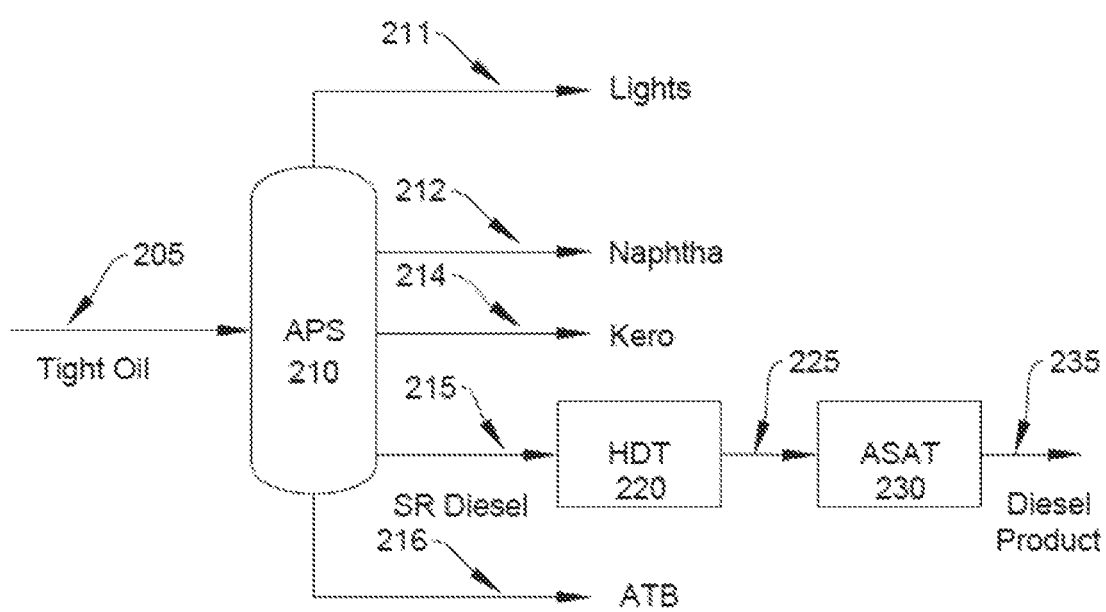
FIG. 2 illustrates a whole crude process flow wherein straight run diesel is processed with hydro-processing reactor and an aromatic removal reactor to produce a high paraffinic diesel product.

One application of the hydrotreatment/aromatic removal process is schematically illustrated in FIG. 2. After flowing through an Atmospheric Distillation Unit 210, the whole crude tight oil petroleum stream 205 is separated into a plurality of petroleum distillate streams including a light ends stream (lights) 211, a naphtha stream 212, a kerosene stream (kero) 214, a straight run diesel stream 215 and an atmospheric tower bottom stream (ATB) 216. The diesel stream 215 is then processed in a hydrotreating reactor 220 and then an aromatic removal reactor 230 to create a petroleum distillate stream 235.

The treated diesel stream of the process of FIG. 2 resulted in the petroleum diesel products (from two tight oil feeds, Tight oil-1 and Tight oil-2) with the following exemplary properties.

|  | Unit | Tight oil-1 as feed | Tight oil-2 as feed |
|---|---|---|---|
| API gravity | degree | 43 | 44 |
| Total Sulfur | ppm | <0.1 | <0.1 |
| Nitrogen | ppm | <0.1 | <0.1 |
| Total aromatics | wt % | 0.2 | 0.2 |
| Total paraffins | wt % | 53.0 | 52.6 |
| Total naphthenes | wt % | 46.8 | 47.2 |
| Cetane Index (ASTM D4737) |  | 72 | 73 |
| Carbon residue | wt % | <0.1 | <0.1 |

The hydrotreating and aromatic removal process of the process of FIG. 2 decreased the sulfur and nitrogen impurities to less than 0.1 ppm, decreased the total aromatics content to about 0.2 wt % and produced a diesel end product with a Cetane Index of greater than 70. Specifically, the additional aromatic removal process produced a diesel product with a total aromatics content of 0.2 wt %.

In one embodiment, the one or more petroleum distillate streams of the method of refining whole crude oil is a high paraffinic diesel product.

In another embodiment, the petroleum distillate stream end product in the method of refining crude oil has a total paraffins content ranging from about 20 to about 80 wt %. In a further embodiment, the petroleum distillate stream end product in the method of refining crude oil has a total paraffins content ranging from about 35 to about 55 wt %.

In another embodiment, the petroleum distillate stream end product has a total naphthenes content ranging from about 40 to about 70 wt %. In a further embodiment, the petroleum distillate stream end product has a naphthenes content ranging from about 40 to about 50 wt %.

In another embodiment, the petroleum distillate stream end product has a total aromatics content of less than 1 wt %. In a further embodiment, the petroleum distillate stream end product has a total aromatics content of equal to or less than 0.2 wt %.

In another embodiment, the petroleum distillate stream end product has a total sulfur content of less than 1 ppm. In a further embodiment, the petroleum distillate stream end product has a total sulfur content of less than 0.1 ppm.

In another embodiment, the petroleum distillate stream end product has a nitrogen content of less than 1 ppm. In a further embodiment, the petroleum distillate stream end product has a nitrogen content of less than 0.1 ppm.

In another embodiment, the high paraffinic diesel product has a Cetane number greater than or equal to 70. In another embodiment, the high paraffinic diesel product has a Cetane Index greater than or equal to 70.

In a further embodiment, the method of refining whole crude oil further comprises dewaxing the lowered aromatics stream. Specifically, the method of refining whole crude oil comprises:
(a) providing a hydrotreating reactor, a distillation tower, an aromatics removal reactor and a whole crude oil stream;
(b) feeding the whole crude oil stream into the distillation tower to produce a plurality of streams comprising light ends stream, a naphtha stream, a kerosene stream, a diesel stream and an atmospheric tower bottom stream;
(c) feeding the diesel stream of step (b) into the hydrotreating reactor to produce a treated diesel stream;
(d) feeding the treated diesel stream into an aromatics saturation reactor or a stacked catalyst bed to produce a lowered aromatics stream
(e) dewaxing the lowered aromatics stream and
(f) processing the further treated diesel stream to create one or more petroleum distillate streams. The dewaxing process produces a petroleum distillate product with improved cold flow properties. That is, the petroleum distillate product exhibits improved properties at low temperatures.

The dewaxing step (e) typically employs a dewaxing catalyst that contains a metal hydrogenation component and a 10 member ring 1-D molecular sieve supported on a refractory metal oxide. The metal hydrogenation component is preferably a Group 8-10 metal, more preferably a noble metal, most preferably Pd, Pt or a mixture thereof. The amount of metal component is in the range from 0.1 to 5 wt. %, based on catalyst, preferably 0.1 to 2 wt. %. The refractory metal oxide may be alumina, silica, silica-alumina, titania, zirconia and the like, preferably alumina, most preferably gamma alumina.

The amount of molecular sieve in the dewaxing catalyst is from 10 to 100 wt. %, preferably 40 to 80 wt. %, based on catalyst. The balance of the dewaxing catalyst is refractory support and metal hydrogenation component. Such catalysts can be formed by methods such spray drying, extrusion and the like. The dewaxing catalyst may be used in the sulfided or unsulfided form, and is preferably in the sulfided form.

The 10 member ring 1-D molecular sieve can be ZSM-23, ZSM-35, ZSM-48, or another suitable molecular sieve. Preferably, the molecular sieve is ZSM-48 with a ratio of silica to alumina in the ZSM-48 of less than about 110:1.

Effective dewaxing conditions involve temperatures in the range of about 240° C. to about 450° C., preferably 300° C. to 400° C. at pressures in the range of about 1480 to 20786 kPa (200 to 3000 psig), preferably 2859 to 13891 kPa (400 to 2000 psig), a space velocity of from 0.1 to 10 LHSV, preferably 0.1 to 5 LHSV, and a hydrogen treat gas rate of from 18 to 890 m$^3$/m$^3$ (100 to 5000 scf/B), preferably 44 to 178 m$^3$/m$^3$ (250 to 1000 scf/B).

Figure 4:
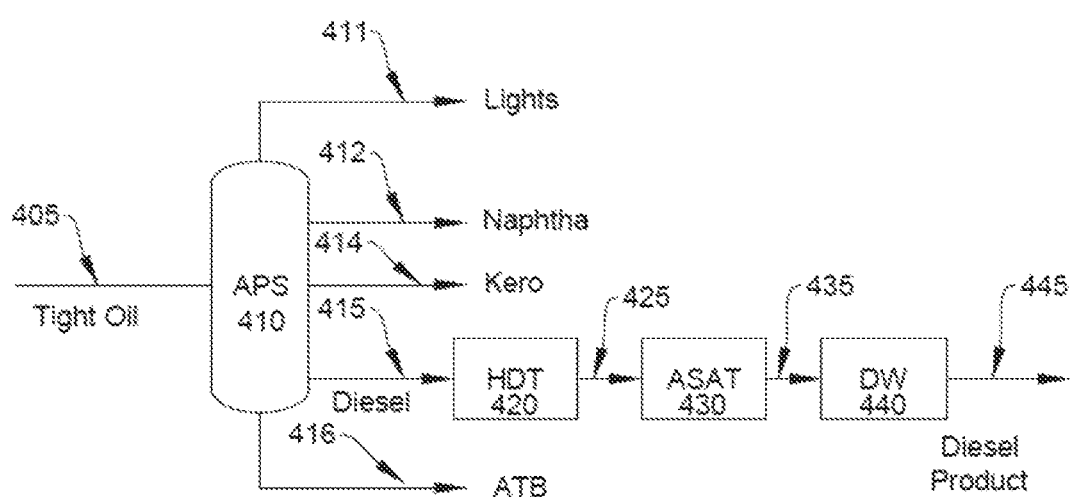
FIG. 4 illustrates a whole crude process flow wherein the straight run diesel is hydro-treated, saturated with hydrogen to lower the aromatic content of the diesel stream and then dewaxed to produce a high paraffinic diesel product.

One application of a hydrotreatment/aromatic removal/dewaxing process is schematically illustrated in FIG. 4. After flowing through an Atmospheric Distillation Unit 410, the whole crude tight oil petroleum stream 405 is separated into a plurality of petroleum distillate streams including a light ends stream (lights) 411, a naphtha stream 412, a kerosene stream (kero) 414, a straight run diesel stream 415 and an atmospheric tower bottom stream (ATB) 416. The diesel stream 415 is then processed in a hydrotreating reactor 420, an aromatic removal reactor 430 and then dewaxed 440 to create a petroleum distillate stream 445.

Exemplary reaction conditions for the hydrotreatment reactor are: temperature 600-650° F., pressure of the hydrogen 600-1000 psig, CoMo catalyst, 0.2-1.4 hr$^{-1}$ liquid hourly space velocity (LHSV), 80-100% hydrogen purity, and H$_2$ treat gas:hydrocarbon gas ratio of 1000-6000 standard cubic feet per barrel (scf/B).

Exemplary reaction conditions for the aromatic removal reactor are: temperature of about 400 to about 700° F., pressure of about 500 to about 700 psig, about 0.5 hr$^{-1}$ to about 2 liquid hourly space velocity (LHSV), hydrogen treat gas:hydrocarbon ratio of about 1000-1500:1 standard cubic feet per barrel (scf/B) and a Pt/Pd catalyst.

Exemplary reaction conditions for the dewaxing reactor are: temperature of about 600 to about 800° F. (about 315 to about 430° C.), pressure of about 600 to about 800 psig, about 1-2 liquid hourly space velocity (LHSV), hydrogen treat gas:hydrocarbon ratio of about 1000-1500:1 standard cubic feet per barrel (scf/B) and a Pt on a ZSM48 zeolite matrix catalyst.

Preferably, the dewaxing catalysts according to the invention are zeolites (and/or zeolitic crystals) that perform dewaxing primarily by isomerizing a hydrocarbon feedstock. More preferably, the catalysts are zeolites with a unidimensional pore structure. Suitable catalysts include 10-member ring pore zeolites, such as EU-1, ZSM-35 (or ferrierite), ZSM-11, ZSM-57, NU-87, SAPO-11, and ZSM-22. Preferred materials are EU-2, EU-11, ZBM-30, ZSM-48, or ZSM-23. ZSM-48 can be the most preferred.

In one embodiment, the dewaxing catalyst is platinum on a ZSM48 zeolite matrix.

The treated diesel stream 445 of the process of FIG. 4 resulted in the petroleum diesel products (from two tight oil feeds, Tight oil-1 and Tight oil-2) with the following exemplary properties.

|  | Unit | Tight oil-1 as feed | Tight oil-2 as feed |
| --- | --- | --- | --- |
| API gravity | degree | 48.7 | 49 |
| Total Sulfur | ppm | <0.1 | <0.1 |
| Nitrogen | ppm | <0.1 | <0.1 |
| Total aromatics | wt % | 0.7 | 0.7 |
| Total paraffins | wt % | 70.9 | 71.6 |
| Total naphthenes | wt % | 28.4 | 27.7 |
| Cetane Index (ASTM D4737) |  | 72 | 73 |
| Carbon residue | wt % | <0.1 | <0.1 |

The hydrotreating/aromatic removal/dewaxing process of FIG. 4 decreased the sulfur and nitrogen impurities to less than 0.1 ppm, decreased the total naphthenes content to about 27.7 to about 28.4 wt % and produced a diesel end product with a Cetane Index of greater than 70. Specifically, the additional dewaxing process produced a diesel product with a total naphthenes content of about 27.7 to about 28.4 wt %.

In a further embodiment, the petroleum distillate stream end product in the method of refining crude oil has a total paraffins content ranging from about 60 to about 80 wt %. In a further embodiment, the petroleum distillate stream end product in the method of refining crude oil has a total paraffins content ranging from about 65 to about 75 wt %.

In another embodiment, the petroleum distillate stream end product has a total naphthenes content ranging from about 20 to about 40 wt %. In a further embodiment, the petroleum distillate stream end product has a naphthenes content ranging from about 20 to about 30 wt %.

In another embodiment, the petroleum distillate stream end product has a total aromatics content of less than 1 wt %.

In another embodiment, the petroleum distillate stream end product has a total sulfur content of less than 1 ppm. In a further embodiment, the petroleum distillate stream end product has a total sulfur content of less than 0.1 ppm.

In another embodiment, the petroleum distillate stream end product has a nitrogen content of less than 1 ppm. In a further embodiment, the petroleum distillate stream end product has a nitrogen content of less than 0.1 ppm.

In another embodiment, the high paraffinic diesel product has a Cetane Index greater than or equal to 70. In another embodiment, the high paraffinic diesel product has a Cetane number greater than or equal to 70. If needed, the high paraffinic diesel product may contain a cetane improver to raise the Cetane number of the high paraffinic diesel product to at least 70.

In another embodiment, the diesel stream of step (c) comprises the diesel and kerosene streams of step (b). In another embodiment, the diesel stream comprises the diesel and kerosene streams from the distillation tower. In a further embodiment, the diesel stream comprising the diesel and kerosene streams of step (b) has a boiling point of about 350 to about 700° F. In a further embodiment, the diesel stream comprising the diesel and kerosene streams of step (b) has a boiling point of about 350 to about 60M F, about 400 to about 700° F. or about 450 to about 700° F.

Whole Crude Hydrotreating

In another embodiment, the crude oil is hydrotreated (HDT) before distillation. Also known as "whole crude hydrotreating", the crude oil is hydro-processed first and then separated into different streams in a distillation tower. Placing a single hydrotreating reactor before a distillation tower eliminates the need for independent hydrotreating reactors on each distilled product stream, which reduces capital building and maintenance expenditures. In addition, a single pre-distillation tower hydrotreating reactor consumes significantly less energy compared to operating multiple hydrotreating reactors post-distillation.

In one embodiment, a method of refining whole crude oil comprises:
 (a) providing a hydrotreating reactor, a distillation tower, an aromatics removal reactor, optionally a stacked catalyst bed and a whole crude oil stream;
 (b) feeding the whole crude oil stream into the hydrotreating reactor to create a treated stream;
 (c) feeding the treated stream into the distillation tower;
 (d) processing the treated stream within the distillation tower to create a plurality of streams comprising light ends stream, a naphtha stream, a kerosene stream, a diesel stream and an atmospheric tower bottom stream;
 (e) feeding the diesel stream into an aromatics removal reactor to produce a lowered to aromatics stream and
 (f) processing the treated stream to create one or more petroleum distillate streams.

Figure 3:
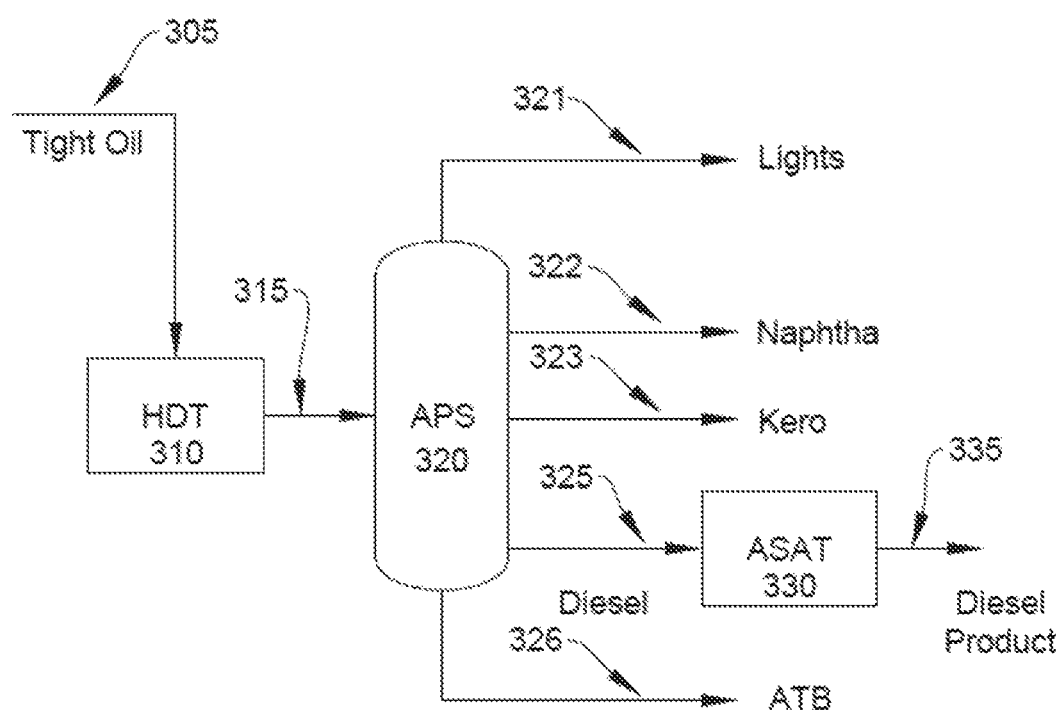
FIG. 3 illustrates a whole crude process flow wherein the crude oil is hydro-treated and the liquid product is cut into streams including a diesel stream, which is saturated with hydrogen to lower the aromatic content of the diesel stream to produce a high paraffinic diesel product.

One application of a whole crude hydrotreatment process is schematically illustrated in FIG. 3. A whole crude tight oil stream 305 is first processed through a hydrotreating reactor 310. A treated stream 305 is created and flows from the hydrotreating reactor 310 to be processed in an atmospheric distillation tower 320. There the treated stream 315 is distilled into multiple petroleum distillate streams including a light ends stream (lights) 321, a naphtha stream 322, a kerosene stream (kero) 323, a diesel stream (diesel) 325 and an atmospheric tower bottom stream (ATB) 326. The diesel stream 325 is then processed in an aromatic removal reactor 330 to create one or more petroleum distillate streams 335.

Exemplary reaction conditions for the hydrotreatment reactor 310 are: temperature 700-800° F., pressure of the hydrogen 800-1000 psig. CoMo catalyst, 0.5 hr$^{-1}$ liquid hourly space velocity (LHSV), 100% hydrogen purity, and H$_2$ treat gas:hydrocarbon gas ratio of 2000-3000 standard cubic feet per barrel (scf/B).

Exemplary reaction conditions for the aromatic removal reactor 330 were: 400-450° F., H$_2$ pressure 600 psig, 100% H$_2$ purity, Pd/Pt catalyst, time in reactor (18 hours) and a catalyst:oil ratio of 1:30 standard cubic feet per barrel (scf/B). More specifically, the catalyst was 0.9 wt % Pd/0.3 wt % Pt on an alumina bound MCM-41 support.

Utilizing the tight oil-2 feed for the process of FIG. 3, the treated diesel stream resulted in a petroleum diesel product with the following exemplary properties. Bulk properties of the Tight oil-2 feed are described in Table 1.

|  | Unit |  |
| --- | --- | --- |
| API gravity | degree | 39.5 |
| Total Sulfur | ppm | <0.2 |
| Nitrogen | ppm | <0.1 |
| Total aromatics | wt % | 0.0 |
| Total paraffins | wt % | 45.0 |
| Total naphthenes | wt % | 55.0 |
| Cetane Number (ASTM D7668) |  | 82 |
| Cetane Index (ASTM D4737) |  | 79 |

ASTM D4737 was used to determine the Cetane Index of the petroleum distillate product. ASTM D4737 refers to the ASTM method titled "Standard Test Method for Calculated Cetane Index by Four Variable Equation." The Calculated Cetane Index by Four Variable Equation is a tool for estimating cetane number of a petroleum distillate product.

ASTM D7668 was used to determine the Cetane Number of the petroleum distillate product. ASTM D7668 refers to the ASTM method titled "Standard Test Method for Determination of Derived Cetane Number (DCN) of Diesel Fuel Oils-Ignition Delay and Combustion Delay Using a Constant Volume Combustion Chamber Method The whole crude hydrotreating/aromatic removal process of FIG. 3 decreased the sulfur impurities to less than 0.2 ppm and nitrogen impurities to less than 0.1 ppm, decreased the total aromatics to 0.0 wt % and produced a diesel end product with a Cetane Number of greater than 80.

In one embodiment, the one or more petroleum distillate streams of the method of refining whole crude oil is a high paraffinic diesel product.

In another embodiment, the petroleum distillate stream end product in the method of refining crude oil has a total paraffins content ranging from about 35 to about 55 wt %. In a further embodiment, the total paraffins content ranges from about 35 to about 50 wt %.

In another embodiment, the petroleum distillate stream end product has a total naphthenes content ranging from about 50 to about 70 wt %. In a further embodiment, the petroleum distillate stream end product has a naphthenes content ranging from about 50 to about 60 wt %. In a further embodiment, the petroleum distillate stream end product has a naphthenes content ranging about 55 wt %.

In another embodiment, the petroleum distillate stream end product has a total aromatics content of less than 1 wt %. In a further embodiment, the petroleum distillate stream end product has an aromatics content of less than 0.1 wt %. In a further embodiment, the petroleum distillate stream end product has an aromatics content of 0.0 wt %. In a further embodiment, the petroleum distillate stream end product has no aromatics content.

In another embodiment, the petroleum distillate stream end product has a sulfur content of less than 1 ppm. In a further embodiment, the petroleum distillate stream end product has a sulfur content of less than 0.2 ppm.

In another embodiment, the high paraffinic diesel product has a Cetane number greater than or equal to 70. In a further embodiment, the high paraffinic diesel product has a Cetane number greater than 70. In a further embodiment, the high paraffinic diesel product has a Cetane number greater than 75. In a further embodiment, the high paraffinic diesel product has a Cetane number greater than 80.

In another embodiment, the high paraffinic diesel product has a Cetane Index greater than or equal to 70. In a further embodiment, the high paraffinic diesel product has a Cetane Index greater than 70. In a further embodiment, the high paraffinic diesel product has a Cetane Index greater than 75.

In another embodiment, the diesel stream of step (e) comprises the diesel and kerosene streams of step (d). In another embodiment, the diesel stream comprises the diesel and kerosene streams from the distillation tower. In a further embodiment, the diesel stream comprising the diesel and kerosene streams of step (d) has a boiling point of about 350 to about 700° F. In a further embodiment, the diesel stream comprising the diesel and kerosene streams of step (d) has a boiling point of about 350 to about 600° F., about 400 to about 700° F. or about 450 to about 700° F.

Whole Crude Wide Cut Hydrotreatment

In one embodiment, the crude oil is flash separated and hydrotreated (HDT) before distillation. Also known as "whole crude wide cut hydrotreating," the whole crude petroleum oil is first flash separated and hydrotreated before distillation. As used herein, the terms "flashing," "flash separator" and "flash evaporation" are used as a general process term descriptive of the process of removing components of crude oil via heating and/or depressurization that results in vaporizing volatile components from the liquid state.

Whole crude wide cut hydrotreating has advantages over whole crude hydrotreating. Tight oil generally has a high naphtha concentration (typically 30-50 wt %) and low sulfur content. Flash evaporating tight oil separates it to light ends, naphtha, and a kerosene plus remainder fraction. The low sulfur content of tight oil permits the naphtha fraction to go directly from the flash evaporation separator to a reformer without hydrotreating. Naphtha is typically vaporized in hydrotreating reactors and reduces the hydrogen partial pressure, which negatively impacts hydrotreating performance. Separating the naphtha before hydrotreating improves the hydrotreating reactor performance while significantly reducing the required reactor size.

In one embodiment, a method of refining whole crude oil comprises:
(a) providing a hydrotreating reactor, a distillation tower, a flash evaporation separator, an aromatics saturation reactor and a whole crude oil stream;
(b) feeding the whole crude oil stream into the flash evaporation separator to create a plurality of streams comprising a light ends stream, a naphtha stream and a kerosene plus stream;
(c) feeding the kerosene plus stream into the hydrotreating reactor to create a treated stream;
(d) feeding the treated stream into the distillation tower;
(e) processing the treated stream within the distillation tower to create a plurality of streams comprising a light ends stream, a naphtha stream, a kerosene stream, a diesel stream and an atmospheric tower bottom stream;

(f) optionally dewaxing the diesel stream before feeding the diesel stream into an aromatics removal reactor or a stacked catalyst bed;

is (g) feeding the diesel stream into an aromatics saturation reactor or a stacked catalyst bed to produce a saturated aromatics diesel stream and (h) processing the saturated aromatics diesel stream to create one or more petroleum distillate streams. As used herein, the "kerosene plus stream." "kerosene+ stream" or "kero+" comprises kerosene and the remaining heavy fractions of the whole crude tight oil stream.

In a further embodiment, kerosene plus stream is fed into a hydrotreating reactor and then the distillation tower. The distillation tower produces a plurality of streams comprising alight ends and a naphtha stream, a kerosene plus stream, a diesel stream and an atmospheric tower bottom stream (ATB). The diesel stream is then processed in an aromatic removal reactor to create one or more petroleum distillate streams.

Figure 5A:
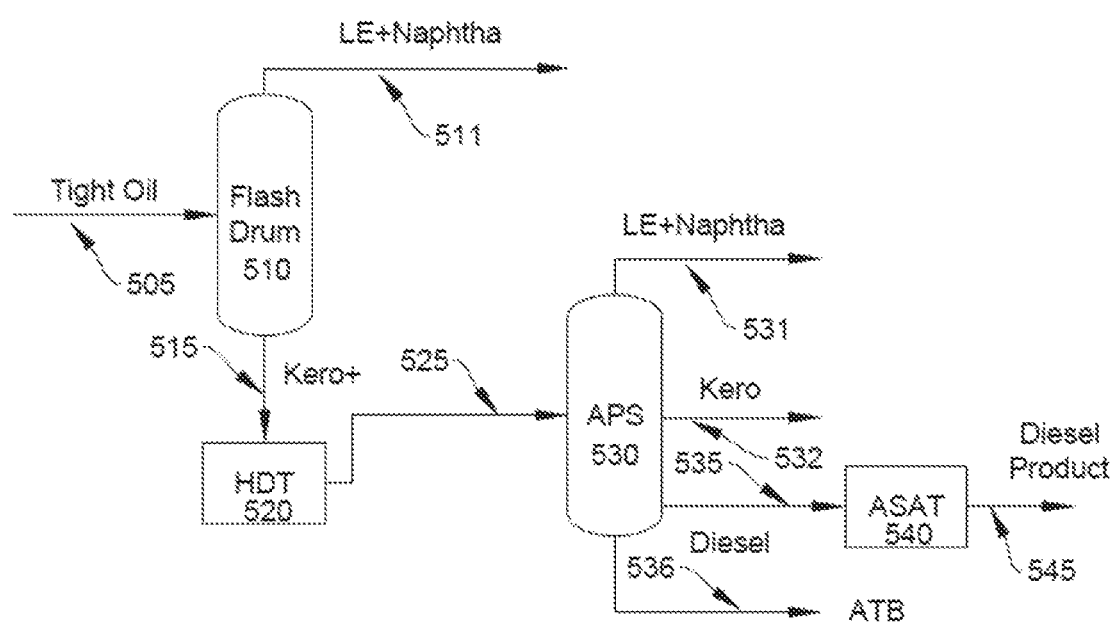
FIG. 5a illustrates a whole crude process flow wherein the crude oil is flashed before hydro-processing and the liquid product is cut into streams including a diesel stream which is saturated with hydrogen to lower the aromatic content of the diesel stream to produce a high paraffinic diesel product.

One application of a whole crude wide cut hydrotreatment process is schematically illustrated in Figure 5a. A whole crude tight oil stream 505 is first pre-flashed in a flash drum reactor 510 before being processed through a hydrotreating reactor 520. The flash drum reactor 510 produces multiple streams including a light ends and naphtha stream (LE+naphtha) 511 and kerosene plus stream 515. The kerosene plus stream 515 is then processed through a hydrotreating reactor 520 to produce a hydrotreated product stream 525. The hydrotreated product stream 525 is then separated into multiple streams in a distillation tower 530 including a light ends and naphtha stream (LE+naphtha) 531, a kerosene plus stream (kero+) 532, a diesel stream (diesel) 535 and an atmospheric tower bottom stream (ATB) 536. The diesel cut stream is then processed in an aromatic removal reactor 540 to create one or more petroleum distillate streams 545.

The flash drum reactor 510 produces a light ends and naphtha stream (LE+naphtha) 511 and a kerosene plus stream 515. The light ends and naphtha stream (LE+naphtha) 511 has a maximum boiling point of 350° F. The kerosene plus stream 515 has a boiling point of greater than 350° F.

Exemplary reaction conditions for the hydrotreatment reactor 520 are: temperature 600-700° F., pressure of the hydrogen 600-800 psig, CoMo catalyst, 0.8-1.2 $hr^{-1}$ liquid hourly space velocity (LHSV), 85% hydrogen purity, and $H_2$ treat gas:hydrocarbon gas ratio of 1000-2000 standard cubic feet per barrel (scf/B).

The hydrotreated product stream 525 is separated into multiple streams in a distillation tower 530 The distillation tower 530 produces a light ends and naphtha stream (LE+naphtha) 531, a kerosene plus stream (kero+) 532, a diesel stream (diesel) 535 and an atmospheric tower bottom stream (ATB) 536 with different boiling points. The light ends stream comprising $C_{1-4}$ hydrocarbons has a boiling point cutoff of about 96° F. The naphtha stream comprising $C_{8-12}$ hydrocarbons has a boiling point from about 96 to about 350° F. The kerosene stream comprising $C_{12-30}$ hydrocarbons has a boiling point from about 350 to about 480° F. The diesel stream comprising $C_{14-20}$ hydrocarbons has a boiling point from about 480 to about 700° F. The atmospheric tower bottom stream comprising $C_{50-100+}$ hydrocarbons has a boiling point greater than 700° F.

Exemplary reaction conditions for the aromatic removal reactor 540 were: 500-600° F., $H_2$ pressure 900 psig, 85% $H_2$ purity, Pt/Pd catalyst, 1-2 $hr^{-1}$ liquid hourly space velocity (LHSV), and $H_2$ treat gas:hydrocarbon gas ratio of 1000-2000 standard cubic feet per barrel (scf/B). The treated diesel stream 545 of the process of Figure 5a resulted in the petroleum diesel products (from two tight oil feeds, Tight oil-1 and Tight oil-2) with the following exemplary properties.

|  | Unit | Tight oil-1 as feed | Tight oil-2 as feed |
| --- | --- | --- | --- |
| API gravity | degree | 43.5 | 43.7 |
| Total Sulfur | ppm | <0.1 | <0.1 |
| Nitrogen | ppm | <0.1 | <0.1 |
| Total aromatics | wt % | 0.3 | 0.3 |
| Total paraffins | wt % | 53.6 | 53.4 |
| Total naphthenes | wt % | 46.1 | 46.3 |
| Cetane Index (ASTM D4737) |  | 73 | 74 |
| Carbon residue (CCR) | wt % | <0.1 | <0.1 |

Figure 5B:
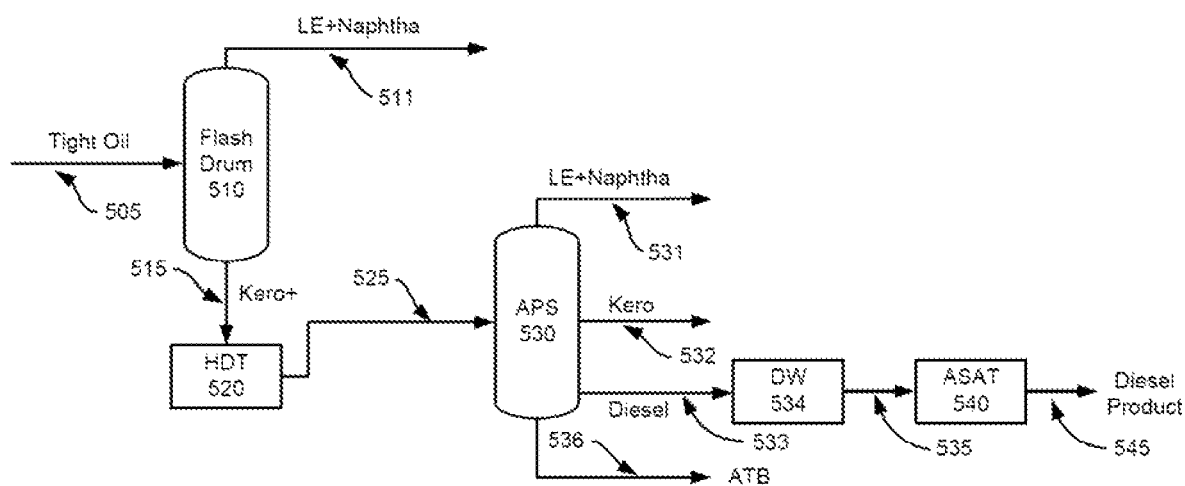
FIG. 5b illustrates a whole crude process flow wherein the crude oil is flashed before hydro-processing and the liquid product is cut into streams including a diesel stream which is dewaxed and then saturated with hydrogen to lower the aromatic content of the diesel stream to produce a high paraffinic diesel product.

In another embodiment, the diesel stream is dewaxed before being fed into an aromatic removal reactor or a stacked catalyst bed. One application of a whole crude wide cut hydrotreated dewaxed process is schematically illustrated in FIG. 5b. A whole crude tight oil stream 505 is first pre-flashed in a flash drum reactor 510 before being processed through a hydrotreating reactor 520. The flash drum reactor 510 produces multiple streams including a light ends and naphtha stream (LE+naphtha) 511 and kerosene plus stream 515. The kerosene plus stream 515 is then processed through a hydrotreating reactor 520 to produce a hydrotreated product stream 525. The hydrotreated product stream 525 is then separated into multiple streams in a distillation tower 530 including a light ends and naphtha stream (LE+naphtha) 531, a kerosene plus stream (kero+) 532, a diesel stream (diesel) 533 and an atmospheric tower bottom stream (ATB) 536. The diesel cut stream 533 is dewaxed in a dewaxing reactor 534 to produce a dewaxed diesel stream 535. The dewaxed diesel stream 535 is then processed in an aromatic removal reactor 540 to create one or more petroleum distillate streams 545.

In one embodiment, the one or more petroleum distillate streams of the method of refining whole crude oil is a high paraffinic diesel product.

In another embodiment, the petroleum distillate stream product in the method of refining crude oil has a total paraffins content ranging from about 50 to about 60 wt %.

In another embodiment, the petroleum distillate stream end product has a total naphthenes content ranging from about 40 to about 50 wt %.

In another embodiment, the petroleum distillate stream end product has a total aromatics content of less than 1 wt %. In a further embodiment, the petroleum distillate stream end product has aromatics content of 0.3 wt %.

In another embodiment, the petroleum distillate stream end product has a sulfur content of less than 1 ppm. In a further embodiment, the petroleum distillate stream end product has a sulfur content of less than 0.1 ppm.

In another embodiment, the high paraffinic diesel product has a Cetane Index greater than or equal to 70. In a further embodiment, the high paraffinic diesel product has a Cetane Index greater than 70.

In another embodiment, the high paraffinic diesel product has a Cetane number greater than or equal to 70. If needed, the high paraffinic diesel product may contain a cetane improver to raise the Cetane number of the high paraffinic diesel product to at least 70.

In another embodiment, the diesel stream of step (g) comprises the diesel and kerosene streams of step (e). In another embodiment, the diesel stream comprises the diesel and kerosene streams from the distillation tower. In a further embodiment, the diesel stream comprising the diesel and kerosene streams of step (e) has a boiling point of about 350 to about 700° F. In a further embodiment, the diesel stream comprising the diesel and kerosene streams of step (e) has a boiling point of about 350 to about 600° F., about 400 to about 700° F. or about 450 to about 700° F.

In a further embodiment, the whole crude wide cut hydrotreatment process further comprises dewaxing the treated stream of step (c) and then feeding the resulting treated stream into the distillation tower of step (d). Specifically, the method of refining whole crude oil comprises:

(a) providing a hydrotreating reactor, a distillation tower, a flash evaporation separator, an aromatics saturation reactor and a whole crude oil stream.

(b) feeding the whole crude oil stream into the flash evaporation separator to create a plurality of streams comprising a light ends stream, a naphtha stream and a kerosene plus stream;

(c) feeding the kerosene plus stream into the hydrotreating reactor to create a treated stream;

(d) dewaxing the treated stream to create a dewaxed treated stream;

(e) feeding the dewaxed treated stream into the distillation tower;

(f) processing the treated stream within the distillation tower to create a plurality of streams comprising a light ends stream, a naphtha stream, a kerosene stream, a diesel stream and an atmospheric tower bottom stream;

(g) feeding the diesel stream into an aromatics saturation reactor or a stacked catalyst bed to produce a saturated aromatics diesel stream and (h) processing the saturated aromatics diesel stream to create one or more petroleum distillate streams.

In another embodiment, the diesel stream of step (g) comprises the diesel and kerosene streams of step (f. In another embodiment, the diesel stream comprises the diesel and kerosene streams from the distillation tower. In a further embodiment, the diesel stream comprising the diesel and kerosene streams of step (f has a boiling point of about 350 to about 700° F. In a further embodiment, the diesel stream comprising the diesel and kerosene streams of step (f has a boiling point of about 350 to about 600° F., about 400 to about 700° F. or about 450 to about 700° F.

Figure 6:
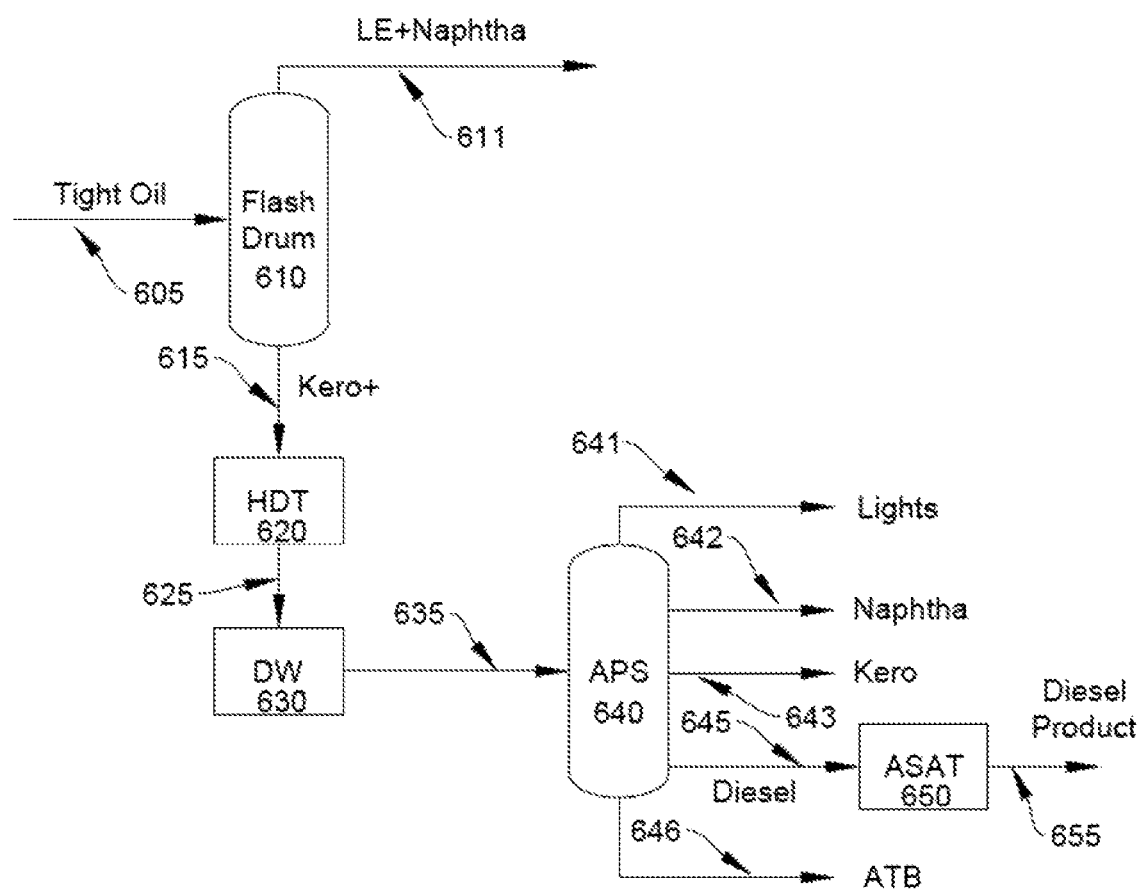
FIG. 6 illustrates a whole crude process flow wherein the crude oil is flashed, hydroprocessed and dewaxed before being fed in a distillation tower.

One application of a whole crude wide cut hydrotreatment/dewaxing process is schematically illustrated in FIG. 6. A whole crude tight oil stream 605 is pre-flashed in a flash drum reactor 610 before being processed through a hydrotreating reactor 620. The flash drum reactor 610 produces multiple streams including a light ends and naphtha stream (LE+naphtha) 611 and kerosene plus stream 615. The light ends and naphtha stream (LE+naphtha) 611 and kerosene plus stream 615 have different boiling point ranges. The light ends and naphtha stream (LE+naphtha) 611 comprises $C_{1-4}$ and $C_{8-12}$ hydrocarbons with a boiling point of less than about 350° F. The kerosene plus stream 615 comprises $C_{12-100+}$ hydrocarbons with a boiling point greater than 350° F.

The kerosene plus stream 615 is then processed through a hydrotreating reactor 620 to produce a hydrotreated product stream 625. Exemplary reaction conditions in the hydrotreating reactor 620 are: temperature of about 600-700° F., total pressure about 600-800 psig, about 80-90% $H_2$ purity, CoMo catalyst, about 0.5-2 $hr^{-1}$ liquid hourly space velocity (LHSV) and a $H_2$ treat gas:hydrocarbon ratio of about 1000-2000 standard cubic feet per barrel (scf/B).

The hydrotreated product stream 625 is then dewaxed in a dewaxing reactor 630 to produce a dewaxed stream 635. Exemplary reaction conditions for the dewaxing reactor are: temperature of about 500-700° F., total pressure about 600-700 psig, about 80-90% $H_2$ purity, Pt-ZSM48 catalyst, about 1-2 $hr^{-1}$ liquid hourly space velocity (LHSV) and a $H_2$ treat gas:hydrocarbon ratio of about 1000-2000 standard cubic feet per barrel (scf/B).

The dewaxed stream 635 is then separated by boiling point into multiple streams in a distillation tower 640 including a light ends stream 641, a naphtha stream 642, a kerosene stream (kero) 643, a diesel stream (diesel) 645 and an atmospheric tower bottom stream (ATB) 646. The light ends stream 641 comprises $C_{1-4}$ hydrocarbons with a boiling point of less than 96° F. The naphtha stream 642 comprises $C_{8-12}$ hydrocarbons with a boiling point from about 96 to about 350° F. The kerosene stream 643 comprises $C_{12-30}$ hydrocarbons with a boiling point from about 350 to about 480° F. The diesel stream 645 comprises $C_{14-20}$ hydrocarbons with a boiling point at about 480 to about 7M) F. The atmospheric tower bottom stream 646 comprises $C_{50-100+}$ hydrocarbons with a boiling point greater than 700°.

The diesel stream 645 is then processed in an aromatic removal reactor 650 to create one or more petroleum distillate streams 655. Exemplary reaction conditions in the aromatic removal reactor 650 are: about 600-700° F., total pressure about 800-1000 psig, about 80-90% H purity. Pt/Pd catalyst, about 1-2 $hr^{-1}$ liquid hourly space velocity (LHSV) and a $H_2$ treat gas:hydrocarbon ratio of about 1000-1500 standard cubic feet per barrel (scf/B).

The treated diesel stream 655 of the process of FIG. 6 from the tight oil feeds of Table 1 resulted in petroleum diesel products with the following exemplary properties.

|  | Unit | Tight oil-1 as feed | Tight oil-2 as feed |
| --- | --- | --- | --- |
| API gravity | degree | 49.6 | 49.8 |
| Total Sulfur | ppm | <0.1 | <0.1 |
| Nitrogen | ppm | <0.1 | <0.1 |
| Total aromatics | wt % | 0.8 | 0.8 |
| Total paraffins | wt % | 74.0 | 74.4 |
| Total naphthenes | wt % | 25.2 | 24.8 |
| Cetane Index (ASTM D4737) |  | 75 | 75 |
| Carbon residue (CCR) | wt % | <0.1 | <0.1 |

Hydrotreatment/Dewaxing

In one embodiment, a method of refining whole crude oil comprises:

(a) providing a hydrotreating reactor, a distillation tower, optionally an aromatic removal reactor and a whole crude oil stream;

(b) feeding the whole crude oil stream into the distillation tower to produce a plurality of streams comprising light ends stream, a naphtha stream, a kerosene stream, a diesel stream and an atmospheric tower bottom stream;

(c) feeding the diesel stream of step (b) into the hydrotreating reactor to produce a treated diesel stream;

(d) dewaxing the treated diesel stream to produce a dewaxed diesel stream; and (e) processing the dewaxed diesel stream to create one or more petroleum distillate streams.

In another embodiment, the diesel stream of step (c) comprises the diesel and kerosene streams of step (b). In another embodiment, the diesel stream comprises the diesel and kerosene streams from the distillation tower. In a further embodiment, the diesel stream comprising the diesel and kerosene streams of step (b) has a boiling point of about 350 to about 700° F. In a further embodiment, the diesel stream comprising the diesel and kerosene streams of step (b) has a boiling point of about 350 to about 600° F., about 400 to about 700° F. or about 450 to about 700° F.

Figure 7:
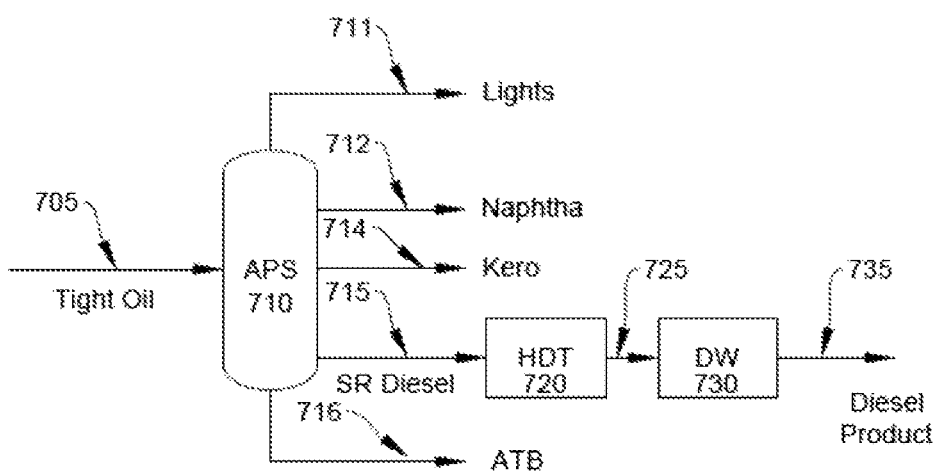
FIG. 7 illustrates a whole crude process flow, where the straight-run diesel is hydro-processed and dewaxed to produce a high paraffinic diesel product.

One application of a whole crude tight oil hydrotreating/dewaxing process flow of is illustrated in FIG. 7. After flowing through an Atmospheric Distillation Unit 710, the whole crude tight oil petroleum stream 705 is separated into a plurality of petroleum distillate streams including a light ends stream (lights) 711, a naphtha stream 712, a kerosene stream (kero) 714, a straight run diesel stream (SR diesel) 715 and an atmospheric tower bottom stream (ATB) 716. The straight run diesel stream 715 is then processed in a hydrotreating reactor 720 and then dewaxed in a dewaxing reactor 730 to create a petroleum distillate stream 735.

The atmospheric distillation tower 710 distilled and separated the incoming crude oil into various fractions of different boiling ranges. The light ends stream 711 comprised $C_{1-4}$ hydrocarbons with a boiling point of less than 96° F. The naphtha stream 712 comprised $C_{8-12}$ hydrocarbons with a boiling point from about 96 to about 350° F. The kerosene stream 714 comprised $C_{12-30}$ hydrocarbons with a boiling point from about 350 to about 480° F. The diesel stream 715 comprised $C_{14-20}$ hydrocarbons with a boiling point at about 480 to about 700° F. The atmospheric tower bottom stream 716 comprised $C_{50-100+}$ hydrocarbons with a boiling point greater than 700° F.

Exemplary reaction conditions in the hydrotreating reactor 720 are: about 600-650° F., total pressure about 800-1000 psig, about 80-90% $H_2$ purity, CoMo catalyst, about 0.2-0.5 $hr^{-1}$ liquid hourly space velocity (LHSV) and a $H_2$ treat gas:hydrocarbon ratio of about 4000-5000 standard cubic feet per barrel (scf/B).

The hydrotreated product stream 725 is then dewaxed in a dewaxing reactor 730 to produce a dewaxed stream 735. Exemplary reaction condition in the dewaxing reactor are: temperature of about 500-700° F., total pressure about 600-700 psig, about 80-90% $H_2$ purity, Pt-ZSM48 catalyst, about 1-2 $hr^{-1}$ liquid hourly space velocity (LHSV) and a $H_2$ treat gas:hydrocarbon ratio of about 1000-1500 standard cubic feet per barrel (scf/B).

The dewaxed diesel stream of the process of FIG. 7 from the tight oil feeds of Table 1 resulted in petroleum diesel products 735 with the following exemplary properties.

|  | Unit | Tight oil-1 as feed | Tight oil-2 as feed |
| --- | --- | --- | --- |
| API gravity | degree | 45.8 | 46 |
| Total Sulfur | ppm | <0.1 | <0.1 |
| Nitrogen | ppm | <0.1 | <0.1 |
| Total aromatics | wt % | 0.7 | 0.7 |
| Total paraffins | wt % | 61.6 | 61.6 |
| Total naphthenes | wt % | 37.6 | 37.6 |
| Cetane Index (ASTM D4737) |  | 72 | 72 |
| Carbon residue (CCR) | wt % | <0.1 | <0.1 |

In a further embodiment, the dewaxed diesel stream of the method of refining whole crude oil is fed into an aromatics removal reactor or a stacked catalyst bed to produce the one or more petroleum distillate streams of step (e). Specifically, the method of refining whole crude oil comprises:

(a) providing a hydrotreating reactor, a distillation tower, an aromatic removal reactor and a whole crude oil stream;

(b) feeding the whole crude oil stream into the distillation tower to produce a plurality of streams comprising light ends stream, a naphtha stream, a kerosene stream, a diesel stream and an atmospheric tower bottom stream;

(c) feeding the diesel stream of step (b) into the hydrotreating reactor to produce a treated diesel stream;

(d) dewaxing the treated diesel stream to produce a dewaxed diesel stream;

(e) feeding the dewaxed diesel stream into an aromatics removal reactor or a stacked catalyst bed to produce a reduced aromatic diesel stream; and (f) processing the reduced aromatic diesel stream to create one or more petroleum distillate streams.

In another embodiment, the diesel stream of step (c) comprises the diesel and kerosene streams of step (b). In another embodiment, the diesel stream comprises the diesel and kerosene streams from the distillation tower. In a further embodiment, the diesel stream comprising the diesel and kerosene streams of step (b) has a boiling point of about 350 to about 700° F. In a further embodiment, the diesel stream comprising the diesel and kerosene streams of step (b) has a boiling point of about 350 to about 600° F., about 400 to about 700° F. or about 450 to about 700° F.

Figure 8:
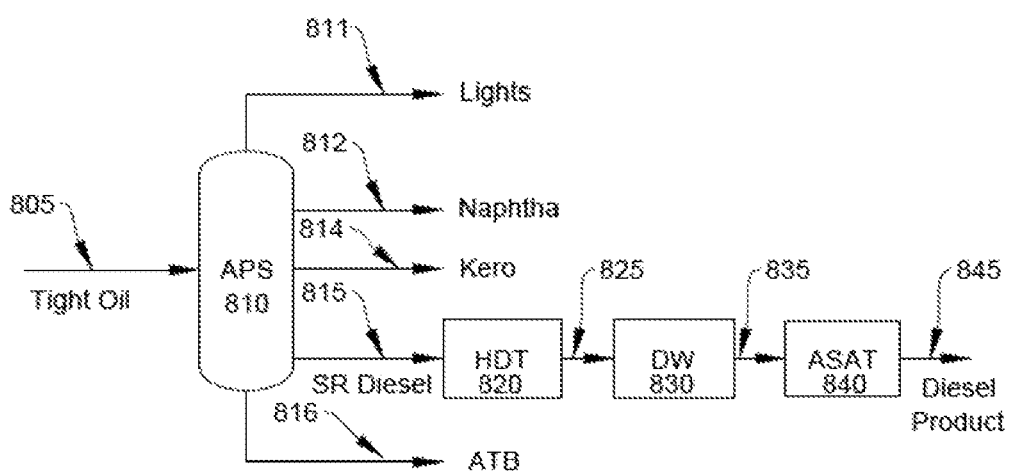
FIG. 8 illustrates a whole crude process flow, where the straight-run diesel is fed into a hydrotreatment reactor, a dewaxing reactor and an aromatic removal reactor to produce a high paraffinic diesel product.

One application of a whole crude tight oil hydrotreating/dewaxing/aromatics removal process flow is illustrated in FIG. 8. After flowing through an Atmospheric Distillation Unit 810, the whole crude tight oil petroleum stream 805 is separated into a plurality of petroleum distillate streams including a light ends stream (lights) 811, a naphtha stream 812, a kerosene stream (kero) 814, a straight run diesel stream (SR diesel) 815 and an atmospheric tower bottom stream (ATB) 816. The straight run diesel stream 815 is then processed in a hydrotreating reactor 820 and then dewaxed in a dewaxing reactor 830 to create a dewaxed diesel stream 835. The dewaxed diesel stream 835 is then fed into an aromatics removal reactor 840 or a stacked catalyst bed to produce a reduced aromatic diesel stream 845 to create one or more petroleum distillate streams.

The atmospheric distillation tower 810 distilled and separated the incoming crude tight oil into various fractions of different boiling ranges. The light ends stream 811 comprised $C_{1-4}$ hydrocarbons with a boiling point of less than 96° F. The naphtha stream 812 comprised $C_{8-12}$ hydrocarbons with a boiling point from about 96 to about 350° F. The kerosene stream 814 comprised $C_{12-20}$ hydrocarbons with a boiling point from about 350 to about 480° F. The diesel stream 815 comprised $C_{14-20}$ hydrocarbons with a boiling point at about 480 to about 700) F. The atmospheric tower bottom stream 816 comprised $C_{50-100+}$ hydrocarbons with a boiling point greater than 700° F.

Exemplary reaction conditions of the hydrotreating reactor 820 are: a temperature of about 500-700° F., total pressure about 600-700 psig, about 80-90% $H_2$ purity, CoMo catalyst, about 1-2 $hr^{-1}$ liquid hourly space velocity (LHSV) and a 112 treat gas:hydrocarbon ratio of about 1100-2000 standard cubic feet per barrel (scf/B).

The hydrotreated product stream 825 is then dewaxed in a dewaxing reactor 830 to produce a dewaxed stream 835. Exemplary reaction conditions of the dewaxing reactor 830 are: temperature of about 500-700° F., total pressure of about 600-700 psig, about 80-90% $H_2$ purity, Pt-ZSM48 catalyst, about 1-2 $hr^{-1}$ liquid hourly space velocity (LHSV) and a $H_2$ treat gas:hydrocarbon ratio of about 1000-1500 standard cubic feet per barrel (scf/B).

The dewaxed product stream 835 is then fed into an aromatics removal reactor 840 or a stacked catalyst bed to produce a reduced aromatic diesel stream 845. Exemplary reaction conditions in the aromatic removal reactor 840 are: a temperature of about 600-700° F., total pressure of about 800-1000 psig, about 80-90% $H_2$ purity. Pt/Pd catalyst, about 1-2 $hr^{-1}$ liquid hourly space velocity (LHSV) and a $H_2$ treat gas:hydrocarbon ratio of about 1000-1500 standard cubic feet per barrel (scf/B).

The reduced aromatic diesel stream 845 of the process of FIG. 8 from the tight oil feeds of Table 1 resulted in petroleum diesel products with the following exemplary properties.

|  | Unit | Tight oil-1 as feed | Tight oil-2 as feed |
|---|---|---|---|
| API gravity | degree | 50 | 50.2 |
| Total Sulfur | ppm | <0.1 | <0.1 |
| Nitrogen | ppm | <0.1 | <0.1 |
| Total aromatics | wt % | 0.8 | 0.8 |
| Total paraffins | wt % | 73.7 | 74.1 |
| Total naphthenes | wt % | 25.5 | 25.1 |
| Cetane Index (ASTM D4737) |  | 74 | 74 |
| Carbon residue (CCR) | wt % | <0.1 | <0.1 |

In another embodiment, the one or more petroleum distillate streams of the method of refining whole crude oil is a high paraffinic diesel product.

In another embodiment, the petroleum distillate stream product in the method of refining crude oil has a total paraffins content ranging from about 65 to about 85 wt %.

In another embodiment, the petroleum distillate stream end product has a total aromatics content of less than 1 wt %. In a further embodiment, the petroleum distillate stream end product has aromatics content of about 0.8 wt %.

In another embodiment, the petroleum distillate stream end product has a sulfur content of less than 1 ppm. In a further embodiment, the petroleum distillate stream end product has a sulfur content of less than 0.1 ppm.

In another embodiment, the high paraffinic diesel product has a Cetane Index greater than or equal to 70. In a further embodiment, the high paraffinic diesel product has a Cetane Index greater than 70.

In another embodiment, the high paraffinic diesel product has a Cetane number greater than or equal to 70. If needed, the high paraffinic diesel product may contain a cetane improver to raise the Cetane number of the high paraffinic diesel product to at least 70.

High Paraffinic Diesel Product

In one embodiment, a high paraffinic diesel product comprises one or more of the petroleum distillate streams described above.

In another embodiment, a high paraffinic diesel product prepared by a method comprises:
(a) blending a petroleum distillate stream and a petroleum distillate stream from one of the methods of refining whole crude oil described above;
(b) processing the blended diesel stream using an aromatic removal process to lower the aromatics content;
(c) optionally processing the stream using hydrotreatment process or de-waxing process and
(d) processing the diesel stream to create a high paraffinic diesel product.

In another embodiment, a high paraffinic diesel product prepared by a method comprises:
(a) providing a hydrotreating reactor, a distillation tower, an aromatics saturation reactor, optionally a stacked catalyst bed and a whole crude oil stream;
(b) feeding the whole crude oil stream into the hydrotreating reactor to create a treated stream;
(c) feeding the treated stream into the distillation tower;
(d) processing the treated stream within the distillation tower to create a plurality of streams comprising light ends stream, a naphtha stream, a kerosene stream, an atmospheric tower bottom stream and a diesel stream;
(e) feeding the diesel stream into an aromatics saturation reactor or a stacked catalyst bed to produce a saturated aromatics stream and
(f) processing the treated stream to create one or more petroleum distillate streams and
(g) preparing a high paraffinic diesel product from at least one of the petroleum distillate streams.

In another embodiment, the high paraffinic diesel product has a Cetane number greater than or equal to 70. If needed, the high paraffinic diesel product may contain a cetane improver to raise the Cetane number of the high paraffinic diesel product to at least 70.

In another embodiment, the diesel stream of step (e) comprises the diesel and kerosene streams of step (d). In another embodiment, the diesel stream comprises the diesel and kerosene streams from the distillation tower. In a further embodiment, the diesel stream comprising the diesel and kerosene streams of step (d) has a boiling point of about 350 to about 700° F. In a further embodiment, the diesel stream comprising the diesel and kerosene streams of step (d) has a boiling point of about 350 to about 600° F., about 400 to about 700° F. or about 450 to about 700'F.

Additional Embodiments

This disclosure may further include one or more of the following non-limiting embodiments:

E1. The high paraffinic diesel product made from a method comprising:
(a) providing a hydrotreating reactor, a distillation tower, an aromatics saturation reactor, optionally a stacked catalyst bed and a whole crude oil stream;
(b) feeding the whole crude oil stream into the hydrotreating reactor to create a treated stream;
(c) feeding the treated stream into the distillation tower;
(d) processing the treated stream within the distillation tower to create a plurality of streams comprising light ends stream, a naphtha stream, a kerosene stream, an atmospheric tower bottom stream and a diesel stream;
(e) feeding the diesel stream into an aromatics saturation reactor or a stacked catalyst bed to produce a saturated aromatics stream and
(f) processing the treated stream to create one or more petroleum distillate streams and
(g) preparing a high paraffinic diesel product from at least one of the petroleum distillate streams.

E2. The high paraffinic diesel product of E1 with an API greater than 38.

E3. The high paraffinic diesel product of E1 with a Cetane number greater than 80.

E4. The high paraffinic diesel product of E1 with a sulfur content less than 1 ppm.

E5. The high paraffinic diesel product of E4 with a sulfur content less than 0.2 ppm.

E6. The high paraffinic diesel product of E1 with substantially no aromatics.

E7. The high paraffinic diesel product of E1 with a total paraffins content ranging from about 45 to about 50 wt %.

E8. The high paraffinic diesel product of E1 with a total naphthenes content ranging from about 50 to about 60 wt %.

E9. The high paraffinic diesel product of E1 wherein the diesel stream comprises the diesel and kerosene streams from the distillation tower.

The various descriptive elements and numerical ranges disclosed herein for the reactants used to make petroleum distillate products, and their use can be combined with other descriptive elements and numerical ranges to describe the invention(s); further, for a given element, any upper numerical limit can be combined with any lower numerical limit described herein. The features of the invention are described in the following non-limiting examples.

EXAMPLES

The following examples illustrated the effect of the different process steps in refining crude oil. Simulation modeling was conducted in the methods described in Examples 1-3 and 5-9. Yields of distillation fractions were determined by simulated distillation (SimDis) using gas chromatography (GC). Experimental data were obtained in the method of Example 4.

Example 1

Methods of refining whole crude tight oil to produce a petroleum distillate are described in Examples 2-6. The exemplary tight oils useful for the present invention have the following bulk properties:

|  | Unit | Tight oil-1 | Tight oil-2 |
|---|---|---|---|
| API | degrees | 48.4 | 47.8 |
| Paraffins | wt % | 50.44 | 49.41 |
| Naphthenes | wt % | 41.03 | 42.86 |
| Aromatics | wt % | 8.47 | 7.67 |
| Total sulfur | ppm | 84 | 124 |
| Aliphatic Sulfur | ppm | 30 | 55 |
| Nitrogen | ppm | 15.8 | 52 |
| Basic Nitrogen | ppm | 6.2 | 15 |
| SIMDIS (ASTM D2887) | | | |
| 5 wt % | | 96.2 | 118.7 |
| 10 wt % | | 155 | 176.8 |
| 20 wt % | | 213.5 | 244.4 |
| 30 wt % | | 258 | 289.7 |
| 50 wt % | | 410.8 | 434 |
| 70 wt % | | 589.9 | 601.1 |
| 80 wt % | | 694.7 | 704.1 |
| 90 wt % | | 830.6 | 856.8 |
| 95 wt % | | 941.6 | 962.2 |
| 99.5 wt % | | 1097.7 | 1107.9 |

Yields of distillation fractions can be determined by simulated distillation (SimDis) using gas chromatography (GC). ASTM D2887 was used to further characterize the tight oil feed stocks. ASTM D2887 refers to the method titled "Standard Test Method For Boiling Range Distribution Of Petroleum Fractions By Gas Chromatography," such that the numbers above refer to the fact that 5% of the tight oil boils at temperatures above 96.2° F. and 95% of the tight oil boils by 941.61° F.

Example 2

A method of refining whole crude tight oil, comprising: feeding the whole crude oil stream into the distillation Lower to produce a light ends stream, a naphtha stream, a kerosene stream, a diesel stream and an atmospheric tower bottom stream; feeding the diesel stream into a hydrotreating reactor to produce a treated diesel stream; and processing the treated diesel stream to create one or more petroleum distillate streams, was conducted. The whole crude tight oil hydrotreating process flow for low heteroatom content petroleum is illustrated in FIG. 1. After flowing through an Atmospheric Distillation Unit 110, the whole crude tight oil petroleum stream 105 is separated into a plurality of petroleum distillate streams including a light ends stream (lights) 111, a naphtha stream 112, a kerosene stream (kero) 114, a straight run diesel stream (SR diesel) 115 and an atmospheric tower bottom stream (ATB) 116. The straight run diesel stream 115 is then processed in a hydrotreating reactor 120 to create a petroleum distillate stream 125.

The atmospheric distillation tower 110 distilled and separated the incoming crude oil into various fractions of different boiling ranges. The light ends stream comprised $C_{1-4}$ hydrocarbons with a boiling point of less than 96° F. The naphtha stream comprised $C_{8-12}$ hydrocarbons with a boiling point from about 96 to about 350° F. The kerosene stream comprised $C_{12-30}$ hydrocarbons with a boiling point from about 350 to about 480° F. The diesel stream comprised $C_{14-20}$ hydrocarbons with a boiling point at about 480 to about 700° F. The atmospheric tower bottom stream comprised $C_{50-100+}$ hydrocarbons with a boiling point greater than 700° F.

The reaction conditions in the hydrotreating reactor 120 were: 610° F., total pressure 900 psig, 85% $H_2$ purity, CoMo catalyst, 0.3 $hr^{-1}$ liquid hourly space velocity (LHSV) and a $H_2$ treat gas:hydrocarbon ratio of 4800 standard cubic feet per barrel (scf/B). The hydrogen purity at the inlet of the HDT reactor ranged from about 81.3 to about 81.4 vol %. The hydrogen purity at the outlet of the HDT reactor was about 80.6 vol %. The hydrogen partial pressure was about 726 psig. The upper limit of the hydrogen and hydrocarbon gases ranged from 943 to 944 psig. The lower limit of the hydrogen and hydrocarbon gases was about 508 psig.

The treated SR diesel stream from the tight oil feeds of Example 1 resulted in petroleum diesel products with the following exemplary properties.

|  | Unit | Tight oil-1 as feed | Tight oil-2 as feed |
|---|---|---|---|
| API gravity | degree | 41.5 | 41.6 |
| Total Sulfur | ppm | <0.1 | <0.1 |
| Nitrogen | ppm | <0.1 | <0.1 |
| Total aromatics | wt % | 0.9 | 0.9 |
| Total paraffins | wt % | 46.5 | 45.4 |
| Total naphthenes | wt % | 52.6 | 53.7 |
| Cetane Index (ASTM D4737) | | 71 | 71 |
| Carbon residue (CCR) | wt % | <0.1 | <0.1 |

The hydrotreating process of Example 2 decreased the sulfur and nitrogen impurities to less than 0.1 ppm and produced a diesel end product with a Cetane Index (as determined by ASTM D4737) of greater than 70.

ASTM D4737 was used to determine the Cetane Index of the petroleum distillate product. ASTM D4737 refers to the method titled "Standard Test Method for Calculated Cetane Index by Four Variable Equation." The Calculated Cetane Index by Four Variable Equation is a tool for estimating cetane number of a petroleum distillate product.

Example 3

A method of refining whole crude tight oil, comprising: feeding the whole crude oil stream into a distillation tower to produce a light ends stream, a naphtha stream, a kerosene stream, an atmospheric tower bottom stream and a diesel stream; feeding the diesel stream into a hydrotreating reactor to produce a treated diesel stream; feeding the treated diesel stream into an aromatics saturation reactor or a stacked catalyst bed to produce a lowered aromatics stream; and processing the further treated diesel stream to create one or more petroleum distillate streams, was conducted. The hydrotreatment/aromatic removal process of Example 3 is schematically illustrated in FIG. 2. After flowing through an Atmospheric Distillation Unit 210, the whole crude tight oil petroleum stream 205 is separated into a plurality of petroleum distillate streams including a light ends stream (lights) 211, a naphtha stream 212, a kerosene stream (kero) 214, a straight run diesel stream 215 and an atmospheric tower bottom stream (ATB) 216. The diesel stream 215 is then processed in a hydrotreating reactor 220 and then an aromatic removal reactor 230 to create a petroleum distillate stream 235.

The atmospheric distillation tower 210 distilled and separated the incoming crude oil into various fractions of different boiling ranges. The light ends stream 211 comprised $C_{1-4}$ hydrocarbons with a boiling point of less than 96° F. The naphtha stream 212 comprised $C_{8-12}$ hydrocarbons with a boiling point from about 96 to about 350° F. The kerosene stream 214 comprised $C_{12-30}$ hydrocarbons with a boiling point from about 350 to about 480° F. The diesel stream 215 comprised $C_{14-20}$ hydrocarbons with a boiling point at about 480 to about 700° F. The atmospheric tower bottom stream 216 comprised $C_{50-100+}$ hydrocarbons with a boiling point greater than 700° F.

The reaction conditions in the hydrotreating reactor 220 were: 600° F., total pressure 650 psig, 85% $H_2$ purity, CoMo catalyst, 1.2 $hr^{-1}$ liquid hourly space velocity (LHSV) and a $H_2$ treat gas:hydrocarbon ratio of 1500 standard cubic feet per barrel (scf/B).

The reaction conditions in the aromatic removal reactor 230 were: 575° F., total pressure 900 psig, 85% $H_2$ purity, Pt/Pd catalyst, 1.3 $hr^{-1}$ liquid hourly space velocity (LHSV) and a $H_2$ treat gas:hydrocarbon ratio of 1200 standard cubic feet per barrel (scf/B).

The treated diesel stream 235 from the tight oil feeds of Example 1 resulted in petroleum diesel products with the following exemplary properties.

|  | Unit | Tight oil-1 as feed | Tight oil-2 as feed |
| --- | --- | --- | --- |
| API gravity | degree | 43 | 44 |
| Total Sulfur | ppm | <0.1 | <0.1 |
| Nitrogen | ppm | <0.1 | <0.1 |
| Total aromatics | wt % | 0.2 | 0.2 |
| Total paraffins | wt % | 53.0 | 52.6 |
| Total naphthenes | wt % | 46.8 | 47.2 |
| Cetane Index (ASTM D4737) |  | 72 | 73 |
| Carbon residue (CCR) | wt % | <0.1 | <0.1 |

The hydrotreating and aromatic removal process of Example 3 decreased the sulfur and nitrogen impurities to less than 0.1 ppm, decreased the total aromatics to about 0.2 wt % and produced a diesel end product with a Cetane Index of greater than 70. Specifically, the additional aromatic removal process produced a diesel product with a total aromatics to 0.2 wt %.

Example 4

A method of refining whole crude tight oil, comprising: feeding a whole crude oil stream into a hydrotreating reactor to create a treated stream; feeding the treated stream into the distillation tower; processing the treated stream within the distillation tower to create a light ends stream, a naphtha stream, a kerosene stream, a diesel stream and an atmospheric tower bottom stream; feeding the diesel stream into an aromatics saturation reactor to produce a saturated aromatics stream and processing the treated stream to create one or more petroleum distillate streams, was conducted. The whole crude hydrotreatment process is schematically illustrated in FIG. 3. A whole crude tight oil stream 305 is first processed through a hydrotreating reactor 310. A treated stream 305 is created and flows from the hydrotreating reactor 310 to be processed in an atmospheric distillation tower 320. There the treated stream 315 is distilled into multiple petroleum distillate streams including a light ends stream (lights) 321, a naphtha stream 322, a kerosene stream (kero) 323, a diesel stream (diesel) 325 and an atmospheric tower bottom stream (ATB) 326. The diesel stream 325 is then processed in an aromatic removal reactor 330 to create one or more petroleum distillate streams 335.

The reaction conditions in the hydrotreating reactor 310 were: 780° F. total pressure 1000 psig, 100% $H_2$ purity, CoMo catalyst, 0.5 $hr^{-1}$ liquid hourly space velocity (LHSV) and a $H_2$ treat gas:hydrocarbon ratio of 2300 standard cubic feet per barrel (scf/B).

The atmospheric distillation tower 320 distilled and separated the incoming hydrotreated feed 315 into various fractions of different boiling ranges. The light ends stream 321 comprised $C_{1-4}$ hydrocarbons with a boiling point of less than 96° F. The naphtha stream 322 comprised $C_{8-12}$ hydrocarbons with a boiling point from about 96 to about 350° F. The kerosene stream 323 comprised $C_{12-30}$ hydrocarbons with a boiling point from about 350 to about 480° F. The diesel stream 325 comprised $C_{14-20}$ hydrocarbons with a boiling point at about 480 to about 700° F. The atmospheric tower bottom stream 326 comprised $C_{50-100+}$ hydrocarbons with a boiling point greater than 700° F.

The reaction conditions in the aromatic removal reactor 330 were: 428° F., $H_2$ pressure 600 psig, 100% $H_2$ purity, Pd/Pt catalyst, time in reactor (18 hours) and a catalyst:oil ratio of 1:30 standard cubic feet per barrel (scf/B). More specifically, the catalyst was 0.9 wt % Pd/0.3 wt % Pt on an alumina bound MCM-41 support.

Utilizing the tight oil-2 feed of Example 1 as the initial feed and diesel stream 325, the treated diesel stream 335 resulted in a petroleum diesel product with the following exemplary properties.

|  | Unit |  |
| --- | --- | --- |
| API gravity | degree | 39.5 |
| Total Sulfur | ppm | <0.2 |
| Nitrogen | ppm | <0.1 |
| Total aromatics | wt % | 0.0 |
| Total paraffins | wt % | 45.0 |
| Total naphthenes | wt % | 55.0 |
| Cetane Number (ASTM D7668) |  | 82 |
| Cetane Index (ASTM D4737) |  | 79 |

The whole crude hydrotreating process of Example 4 decreased the sulfur impurities to less than 0.2 ppm and nitrogen impurities to less than 0.1 ppm. It further decreased the total aromatics to 0.0 wt % and produced a diesel end product with a Cetane Number (as determined from ASTM D7668) of 82. Calculations of the Cetane Index (as determined from ASTM D4737) yielded a value of 79.

Example 5

A method of refining whole crude tight oil, comprising: feeding the whole crude oil stream into a distillation tower to produce a light ends stream, a naphtha stream, a kerosene stream, an atmospheric tower bottom stream and a diesel stream; feeding the diesel stream into a hydrotreating reactor to produce a treated diesel stream; feeding the treated diesel stream into an aromatics saturation reactor or a stacked catalyst bed to produce a lowered aromatics stream; dewaxing the lowered aromatics stream and processing the further treated diesel stream to create one or more petroleum distillate streams. was conducted. The dewaxing process produced a petroleum distillate product with improved cold flow properties. That is, the petroleum distillate product exhibited improved properties at low temperatures.

The hydrotreatment % aromatic removal/dewaxing process is schematically illustrated in FIG. 4. After flowing through an Atmospheric Distillation Unit 410, the whole crude tight oil petroleum stream 405 is separated into a plurality of petroleum distillate streams including a light ends stream (lights) 411, a naphtha stream 412, a kerosene stream (kero) 414, a straight run diesel stream 415 and an atmospheric tower bottom stream (ATB) 416. The diesel stream 415 is then processed in a hydrotreating reactor 420, an aromatic removal reactor 430 and then dewaxed 440 to create a petroleum distillate stream 445.

The atmospheric distillation tower 410 distilled and separated the incoming crude oil into various fractions of different boiling ranges. The light ends stream 411 comprised $C_{1-4}$ hydrocarbons with a boiling point of less than 96° F. The naphtha stream 412 comprised $C_{8-12}$ hydrocarbons with a boiling point from about 96 to about 350° F. The kerosene stream 414 comprised $C_{12-30}$ hydrocarbons with a boiling point from about 350 to about 480° F. The diesel stream 415 comprised $C_{14-20}$ hydrocarbons with a boiling point at about 480 to about 700° F. The atmospheric tower bottom stream 416 comprised $C_{50-100+}$ hydrocarbons with a boiling point greater than 700° F.

The reaction conditions in the hydrotreating reactor 420 were: 600° F., total pressure 650 psig, 85% $H_2$ purity, CoMo catalyst, 1.2 hr$^{-1}$ liquid hourly space velocity (LHSV) and a $H_2$ treat gas:hydrocarbon ratio of 1500 standard cubic feet per barrel (scf/B).

The reaction conditions in the aromatic removal reactor 430 were: 625° F., total pressure 900 psig, 85% $H_2$ purity, Pt/Pd catalyst, 1.5 hr$^{-1}$ liquid hourly space velocity (LHSV) and a $H_2$ treat gas:hydrocarbon ratio of 1200 standard cubic feet per barrel (scf/B).

The reaction conditions in the dewaxing reactor 440 were 600° F., total pressure 650 psig, 85% $H_2$ purity, Pt-ZSM48 catalyst, 1.4 hr$^{-1}$ liquid hourly space velocity (LHSV) and a $H_2$ treat gas:hydrocarbon ratio of 1200 standard cubic feet per barrel (scf/B).

The treated diesel stream 440 from the tight oil feeds of Example 1 resulted in petroleum diesel products with the following exemplary properties.

| | Unit | Tight oil-1 as feed | Tight oil-2 as feed |
|---|---|---|---|
| API gravity | degree | 48.7 | 49 |
| Total Sulfur | ppm | <0.1 | <0.1 |
| Nitrogen | ppm | <0.1 | <0.1 |
| Total aromatics | wt % | 0.7 | 0.7 |
| Total paraffins | wt % | 70.9 | 71.6 |
| Total naphthenes | wt % | 28.4 | 27.7 |
| Cetane Index (ASTM D4737) | | 72 | 73 |
| Carbon residue (CCR) | wt % | <0.1 | <0.1 |

The hydrotreating/aromatic removal/dewaxing process of Example 5 decreased the sulfur and nitrogen impurities to less than 0.1 ppm, decreased the total naphthenes content to about 27.7 to about 28.4 wt % and produced a diesel end product with a Cetane Index of greater than 70. Specifically, the additional dewaxing process produced a diesel product with a total naphthenes content of about 27.7 to about 28.4 wt %.

Example 6

A method of refining whole crude tight oil, comprising: feeding a whole crude oil stream into a flash evaporation separator to create a light ends stream, a naphtha stream and a kerosene plus stream; feeding the kerosene plus stream into a hydrotreating reactor to create a treated stream; feeding the treated stream into a distillation tower; processing the treated stream within the distillation tower to create a light ends stream, a naphtha stream, a kerosene stream, an atmospheric tower bottom stream and a diesel stream; feeding the diesel stream into an aromatics saturation reactor or a stacked catalyst bed to produce a saturated aromatics diesel stream and processing the saturated aromatics diesel stream to create one or more petroleum distillate streams, was conducted.

The whole crude wide cut hydrotreatment process is schematically illustrated in FIG. 5a. A whole crude tight oil stream 505 was pre-flashed in a flash drum reactor 510 before being processed through a hydrotreating reactor 520. The flash drum reactor 510 produced multiple streams including a light ends and naphtha stream (LE+naphtha) 511 and kerosene plus stream 515. The light ends and naphtha stream (LE+naphtha) 511 and kerosene plus stream 515 had different boiling point ranges. The light ends and naphtha stream (LE+naphtha) 511 comprised $C_{1-4}$ and $C_{8-12}$ hydrocarbons with a boiling point of less than about 350° F. The kerosene plus stream 515 comprised $C_{12-100+}$ hydrocarbons with a boiling point greater than 350° F.

The kerosene plus stream 515 was then processed through a hydrotreating reactor 520 to produce a hydrotreated product stream 525. The reaction conditions in the hydrotreating reactor 520 were: 675° F., total pressure 700 psig, 85% $H_2$ purity, CoMo catalyst, 1 hr$^{-1}$ liquid hourly space velocity (LHSV) and a $H_2$ treat gas:hydrocarbon ratio of 1500 standard cubic feet per barrel (scf/B).

The hydrotreated product stream 525 is then separated into multiple streams in a distillation tower 530 including a light ends and naphtha stream (LE+naphtha) 531, a kerosene plus stream (kero+) 532, a diesel stream (diesel) 535 and an atmospheric tower bottom stream (ATB) 536. The atmospheric distillation tower 530 distilled and separated the hydrotreated product stream 525 into various fractions of different boiling ranges. The light ends and naphtha stream 531 comprised $C_{1-4}$ and $C_{8-12}$ hydrocarbons with a boiling point of less than 354° F. The kerosene stream 532 comprised $C_{12-30}$ hydrocarbons with a boiling point from about 350 to about 480° F. The diesel stream 535 comprised $C_{14-20}$ hydrocarbons with a boiling point at about 480 to about 700° F. The atmospheric tower bottom stream 536 comprised $C_{50-100+}$ hydrocarbons with a boiling point greater than 700° F.

The diesel cut stream was then processed in an aromatic removal reactor 540 to create one or more petroleum distillate streams 545. The reaction conditions in the aromatic removal reactor 540 were: 575° F., total pressure 900 psig, 85% $H_2$ purity, Pt/Pd catalyst, 1.4 $hr^{-1}$ liquid hourly space velocity (LHSV) and a $H_2$ treat gas:hydrocarbon ratio of 1200 standard cubic feet per barrel (scf/B).

The treated diesel stream 545 from the tight oil feeds of Example 1 resulted in petroleum diesel products with the following exemplary properties.

|   | Unit | Tight oil-1 as feed | Tight oil-2 as feed |
|---|---|---|---|
| API gravity | degree | 43.5 | 43.7 |
| Total Sulfur | ppm | <0.1 | <0.1 |
| Nitrogen | ppm | <0.1 | <0.1 |
| Total aromatics | wt % | 0.3 | 0.3 |
| Total paraffins | wt % | 53.6 | 53.4 |
| Total naphthenes | wt % | 46.1 | 46.3 |
| Cetane Index (ASTM D4737) |  | 73 | 74 |
| Carbon residue (CCR) | wt % | <0.1 | <0.1 |

Example 7

A method of refining whole crude tight oil, comprised: feeding a whole crude oil stream into a flash evaporation separator to create a light ends stream, a naphtha stream and a kerosene plus stream; feeding the kerosene plus stream into a hydrotreating reactor to create a treated stream; dewaxing the treated stream; feeding the dewaxed treated stream into a distillation tower; processing the treated stream within the distillation tower to create a light ends stream, a naphtha stream, a kerosene stream, an atmospheric tower bottom stream and a diesel stream; feeding the diesel stream into an aromatics saturation reactor or a stacked catalyst bed to produce a saturated aromatics diesel stream and processing the saturated aromatics diesel stream to create one or more petroleum distillate streams, was conducted. The whole crude wide cut hydrotreatment/dewaxing process is schematically illustrated in FIG. 6. A whole crude tight oil stream 605 was pre-flashed in a flash drum reactor 610 before being processed through a hydrotreating reactor 620. The flash drum reactor 610 produced multiple streams including a light ends and naphtha stream (LE+naphtha) 611 and kerosene plus stream 615. The light ends and naphtha stream (LE+naphtha) 611 and kerosene plus stream 615 had different boiling point ranges. The light ends and naphtha stream (LE+naphtha) 611 comprised $C_{1-4}$ and $C_{8-12}$ hydrocarbons with a boiling point of less than about 350° F. The kerosene plus stream 615 comprised $C_{12-100+}$ hydrocarbons with a boiling point greater than 350° F.

The kerosene plus stream 615 was then processed through a hydrotreating reactor 620 to produce a hydrotreated product stream 625. The reaction conditions in the hydrotreating reactor 620 were: temperature of 675° F., total pressure 700 psig, 85% $H_2$ purity, CoMo catalyst, 1 $hr^{-1}$ liquid hourly space velocity (LHSV) and a $H_2$ treat gas:hydrocarbon ratio of 1500 standard cubic feet per barrel (scf/B).

The hydrotreated product stream 625 was then dewaxed in a dewaxing reactor 630 to produce a dewaxed stream 635. The dewaxing reactor had the following reaction conditions: temperature of 600° F., total pressure 650 psig, 85% $H_2$ purity. Pt-ZSM48 catalyst, 1.4 $hr^{-1}$ liquid hourly space velocity (LHSV) and a $H_2$ treat gas:hydrocarbon ratio of 1200 standard cubic feet per barrel (scf/B).

The dewaxed stream 635 was then separated by boiling point into multiple streams in a distillation tower 640 including a light ends stream 641, a naphtha stream 642, a kerosene stream (kero) 643, a diesel stream (diesel) 645 and an atmospheric tower bottom stream (ATB) 646. The light ends stream 641 comprised $C_{1-4}$ hydrocarbons with a boiling point of less than 96° F. The naphtha stream 642 comprised $C_{8-12}$ hydrocarbons with a boiling point from about 96 to about 350° F. The kerosene stream 643 comprised $C_{12-30}$ hydrocarbons with a boiling point from about 350 to about 480° F. The diesel stream 645 comprised $C_{14-20}$ hydrocarbons with a boiling point at about 480 to about 700° F. The atmospheric tower bottom stream 646 comprised $C_{50-100+}$ hydrocarbons with a boiling point greater than 700° F.

The diesel stream 645 was then processed in an aromatic removal reactor 650 to create one or more petroleum distillate streams 655. The reaction conditions in the aromatic removal reactor 650 were: 625° F., total pressure 900 psig, 85% $H_2$ purity, Pt/Pd catalyst, 1.3 $hr^{-1}$ liquid hourly space velocity (LHSV) and a $H_2$ treat gas:hydrocarbon ratio of 1200 standard cubic feet per barrel (scf/B).

The treated diesel stream 655 from the tight oil feeds of Example 1 resulted in petroleum diesel products with the following exemplary properties.

|   | Unit | Tight oil-1 as feed | Tight oil-2 as feed |
|---|---|---|---|
| API gravity | degree | 49.6 | 49.8 |
| Total Sulfur | ppm | <0.1 | <0.1 |
| Nitrogen | ppm | <0.1 | <0.1 |
| Total aromatics | wt % | 0.8 | 0.8 |
| Total paraffins | wt % | 74.0 | 74.4 |
| Total naphthenes | wt % | 25.2 | 24.8 |
| Cetane Index (ASTM D4737) |  | 75 | 75 |
| Carbon residue (CCR) | wt % | <0.1 | <0.1 |

The flash drum/hydrotreating/dewaxing process of Example 7 decreased the sulfur and nitrogen impurities to less than 0.1 ppm, decreased the total naphthenes content to about 24.8 to about 25.2 wt % and produced a diesel end product with a Cetane Index of 75. Specifically, the additional dewaxing process produced a diesel product with a total naphthenes content of about 24.8 to about 25.2 wt %.

Example 8

A method of refining whole crude tight oil, comprising: feeding the whole crude oil stream into the distillation tower to produce a light ends stream, a naphtha stream, a kerosene stream, a diesel stream and an atmospheric tower bottom stream; feeding the diesel stream into a hydrotreating reactor to produce a treated diesel stream; dewaxing the treated diesel stream to produce a dewaxed diesel stream; and processing the dewaxed diesel stream to create one or more petroleum distillate streams, was conducted. The whole crude tight oil hydrotreating/dewaxing process flow of Example 8 is illustrated in FIG. 7. After flowing through an Atmospheric Distillation Unit 710, the whole crude tight oil petroleum stream 705 is separated into a plurality of petroleum distillate streams including a light ends stream (lights) 711, a naphtha stream 712, a kerosene stream (kero) 714, a straight run diesel stream (SR diesel) 715 and an atmospheric tower bottom stream (ATB) 716. The straight run diesel stream 715 is then processed in a hydrotreating reactor 720 and then dewaxed in a dewaxing reactor 730 to create a petroleum distillate stream 735.

The atmospheric distillation tower 710 distilled and separated the incoming crude oil into various fractions of different boiling ranges. The light ends stream 711 comprised $C_{1-4}$ hydrocarbons with a boiling point of less than 96° F. The naphtha stream 712 comprised $C_{8-12}$ hydrocarbons with a boiling point from about 96 to about 350° F. The kerosene stream 714 comprised $C_{12-30}$ hydrocarbons with a boiling point from about 350 to about 480° F. The diesel stream 715 comprised $C_{14-20}$ hydrocarbons with a boiling point at about 480 to about 700° F. The atmospheric tower bottom stream 716 comprised $C_{50-100+}$ hydrocarbons with a boiling point greater than 700° F.

The reaction conditions in the hydrotreating reactor 720 were: 610° F., total pressure 900 psig, 85% $H_2$ purity, CoMo catalyst, 0.3 $hr^{-1}$ liquid hourly space velocity (LHSV) and a $H_2$ treat gas:hydrocarbon ratio of 4800 standard cubic feet per barrel (scf/B).

The hydrotreated product stream 725 was then dewaxed in a dewaxing reactor 730 to produce a dewaxed stream 735. The dewaxing reactor had the following reaction conditions: temperature of 600° F., total pressure 650 psig, 85% $H_2$ purity, Pt-ZSM48 catalyst, 1.4 $hr^{-1}$ liquid 20 hourly space velocity (LHSV) and a $H_2$ treat gas:hydrocarbon ratio of 1200 standard cubic feet per barrel (scf/B).

The dewaxed diesel stream from the tight oil feeds of Example 1 resulted in petroleum diesel products 735 with the following exemplary properties.

|  | Unit | Tight oil-1 as feed | Tight oil-2 as feed |
| --- | --- | --- | --- |
| API gravity | degree | 45.8 | 46 |
| Total Sulfur | ppm | <0.1 | <0.1 |
| Nitrogen | ppm | <0.1 | <0.1 |
| Total aromatics | wt % | 0.7 | 0.7 |
| Total paraffins | wt % | 61.6 | 61.6 |
| Total naphthenes | wt % | 37.6 | 37.6 |
| Cetane Index (ASTM D4737) |  | 72 | 72 |
| Carbon residue (CCR) | wt % | <0.1 | <0.1 |

The hydrotreating/dewaxing process of Example 8 decreased the sulfur and nitrogen impurities to less than 0.1 ppm, decreased the total naphthenes content to about 37.6 wt % and produced a diesel end product with a Cetane Index of 72. Specifically, the additional dewaxing process produced a diesel product with a total naphthenes content of about 37.6 wt %.

Example 9

A method of refining whole crude tight oil, comprising: feeding the whole crude oil stream into the distillation tower to produce a light ends stream, a naphtha stream, a kerosene stream, a diesel stream and an atmospheric tower bottom stream; feeding the diesel stream into a hydrotreating reactor to produce a treated diesel stream; dewaxing the treated diesel stream to produce a dewaxed diesel stream; feeding the dewaxed diesel stream into an aromatics removal reactor or a stacked catalyst bed to produce a reduced aromatic diesel stream; and processing the reduced aromatic diesel stream to create one or more petroleum distillate streams, was conducted. The whole crude tight oil hydrotreating/dewaxing/aromatics removal process flow is illustrated in FIG. 8. After flowing through an Atmospheric Distillation Unit 810, the whole crude tight oil petroleum stream 805 is separated into a plurality of petroleum distillate streams including a light ends stream (lights) 811, a naphtha stream 812, a kerosene stream (kero) 814, a straight run diesel stream (SR diesel) 815 and an atmospheric tower bottom stream (ATB) 816. The straight run diesel stream 815 is then processed in a hydrotreating reactor 820 and then dewaxed in a dewaxing reactor 830 to create a dewaxed diesel stream 835. The dewaxed diesel stream 835 was then fed into an aromatics removal reactor 840 or a stacked catalyst bed to produce a reduced aromatic diesel stream 845 to create one or more petroleum distillate streams.

The atmospheric distillation tower 810 distilled and separated the incoming crude tight oil into various fractions of different boiling ranges. The light ends stream 811 comprised $C_{1-4}$ hydrocarbons with a boiling point of less than 96° F. The naphtha stream 812 comprised $C_{8-12}$ hydrocarbons with a boiling point from about 96 to about 350° F. The kerosene stream 814 comprised $C_{12-30}$ hydrocarbons with a boiling point from about 350 to about 480° F. The diesel stream 815 comprised $C_{14-20}$ hydrocarbons with a boiling point at about 480 to about 700° F. The atmospheric tower bottom stream 816 comprised $C_{50-100+}$ hydrocarbons with a boiling point greater than 700° F.

The reaction conditions of the hydrotreating reactor 820 were: a temperature of 600° F., total pressure 650 psig, 85% $H_2$ purity, CoMo catalyst, 1.2 $hr^{-1}$ liquid hourly space velocity (LHSV) and a $H_2$ treat gas:hydrocarbon ratio of 1500 standard cubic feet per barrel (scf/B).

The hydrotreated product stream 825 was then dewaxed in a dewaxing reactor 830 to produce a dewaxed stream 835. The dewaxing reactor 830 had the following reaction conditions: temperature of 600° F., total pressure of 650 psig, 85% $H_2$ purity, Pt-ZSM48 catalyst, 1.4 $hr^{-1}$ liquid hourly space velocity (LHSV) and a $H_2$ treat gas:hydrocarbon ratio of 1200 standard cubic feet per barrel (scf/B).

The dewaxed product stream 835 was then fed into an aromatics removal reactor 840 or a stacked catalyst bed to produce a reduced aromatic diesel stream 845. The reaction conditions in the aromatic removal reactor 840 were: a temperature of 625° F., total pressure of 900 psig, 85% $H_2$ purity, Pt/Pd catalyst, 1.5 $hr^{-1}$ liquid hourly space velocity (LHSV) and a $H_2$ treat gas:hydrocarbon ratio of 1200 standard cubic feet per barrel (scf/B).

The reduced aromatic diesel stream 845 from the tight oil feeds of Example 1 resulted in petroleum diesel products with the following exemplary properties.

|  | Unit | Tight oil-1 as feed | Tight oil-2 as feed |
| --- | --- | --- | --- |
| API gravity | degree | 50 | 50.2 |
| Total Sulfur | ppm | <0.1 | <0.1 |
| Nitrogen | ppm | <0.1 | <0.1 |
| Total aromatics | wt % | 0.8 | 0.8 |
| Total paraffins | wt % | 73.7 | 74.1 |
| Total naphthenes | wt % | 25.5 | 25.1 |
| Cetane Index (ASTM D4737) |  | 74 | 74 |
| Carbon residue (CCR) | wt % | <0.1 | <0.1 |

The hydrotreating/dewaxing/aromatics removal process of Example 9 decreased the sulfur and nitrogen impurities to less than 0.1 ppm, decreased the total naphthenes content to about 25.1 to about 25.5 wt % and produced a diesel end product with a Cetane Index of 74. Specifically, the additional aromatics removal process produced a diesel product with a total naphthenes content of about 25.1 to about 25.5 wt % wt %. This is contrast to the diesel product of Example 8 (without the aromatics removal step) which had a total naphthenes content of about 37.6 wt %.

The process flows of Example 5 (FIG. 4) and Example 9 (FIG. 8) differ in the placement of the aromatics removal and dewaxing steps. In Example 5, the aromatics removal step is before the dewaxing step. In Example 9, the aromatics removal step is after the dewaxing step.

In the specification and in the claims, the terms "including" and "comprising" are open-ended terms and should be interpreted to mean "including, but not limited to". These terms encompass the more restrictive terms "consisting essentially of" and "consisting of." It must be noted that as used herein and in the appended claims, the singular forms "a" "an", and "the" include plural reference unless the context clearly dictates otherwise. As well, the terms "a" (or "an"), "one or more" and "at least one" can be used interchangeably herein. It is also to be noted that the terms "comprising". "including", "characterized by" and "having" can be used interchangeably.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

What is claimed is:

1. A method of refining whole crude oil, the method comprising:
   (a) providing a hydrotreating reactor, a distillation tower, optionally an aromatic removal reactor and a whole crude oil stream, the whole crude oil stream having greater than 50 wt % paraffin and naphthenes and an aliphatic sulfur content of about 20 ppm to about 70 ppm;
   (b) feeding the whole crude oil stream into the distillation tower to produce a plurality of streams comprising light ends stream, a naphtha stream, a kerosene stream, a diesel stream and an atmospheric tower bottom stream;
   (c) feeding the diesel stream of step (b) into the hydrotreating reactor to produce a treated diesel stream and
   (d) processing the treated diesel stream to create one or more petroleum distillate streams.

2. The method of claim 1 further comprising feeding the treated diesel stream into an aromatic removal reactor or a stacked catalyst bed to produce a lowered aromatics stream.

3. The method of claim 2 further comprising dewaxing the lowered aromatics stream.

4. A method of refining whole crude oil, the method comprising:
   (a) providing a hydrotreating reactor, a distillation tower, an aromatics removal reactor, optionally a stacked catalyst bed and a whole crude oil stream, the whole crude stream comprising 85 wt % or more of paraffins and naphthenes;
   (b) feeding the whole crude oil stream into the hydrotreating reactor to create a treated stream;
   (c) feeding the treated stream into the distillation tower;
   (d) processing the treated stream within the distillation tower to create a plurality of streams comprising light ends stream, a naphtha stream, a kerosene stream, a diesel stream and an atmospheric tower bottom stream;
   (e) feeding the diesel stream into an aromatics removal reactor or a stacked catalyst bed to produce a lowered aromatics stream and
   (f) processing the treated stream to create one or more petroleum distillate streams.

5. A method of refining whole crude oil, the method comprising:
   (a) providing a hydrotreating reactor, a distillation tower, a flash evaporation separator, an aromatics removal reactor and a whole crude oil stream, the whole crude stream comprising 85 wt % or more of paraffins and naphthenes;
   (b) feeding the whole crude oil stream into the flash evaporation separator to create a plurality of streams comprising a light ends stream, a naphtha stream and a kerosene plus stream;
   (c) feeding the kerosene plus stream into the hydrotreating reactor to create a treated stream;
   (d) feeding the treated stream into the distillation tower;
   (e) processing the treated stream within the distillation tower to create a plurality of streams comprising a light ends stream, a naphtha stream, a kerosene stream, an atmospheric tower bottom stream and a diesel stream;
   (f) optionally dewaxing the diesel stream before feeding the diesel stream into an aromatics removal reactor or a stacked catalyst bed;
   (g) feeding the diesel stream into an aromatics removal reactor or a stacked catalyst bed to produce a lowered aromatics diesel stream and
   (h) processing the lowered aromatics diesel stream to create one or more petroleum distillate streams.

6. The method of claim 5 further comprising dewaxing the treated stream of step (c) and then feeding the resulting treated stream into the distillation tower of step (d).

7. A method of refining whole crude oil, the method comprising:
   (a) providing a hydrotreating reactor, a distillation tower, optionally an aromatic removal reactor and a whole crude oil stream, the whole crude stream comprising 85 wt % or more of paraffins and naphthenes;
   (b) feeding the whole crude oil stream into the distillation tower to produce a plurality of streams comprising a light ends stream, a naphtha stream, a kerosene stream, a diesel stream and an atmospheric tower bottom stream;
   (c) feeding the diesel stream of step (b) into the hydrotreating reactor to produce a treated diesel stream;
   (d) dewaxing the treated diesel stream to produce a dewaxed diesel stream: and
   (e) processing the dewaxed diesel stream to create one or more petroleum distillate streams, the one or more petroleum distillate streams being a high paraffinic diesel product having a Cetane index greater than greater than or equal to 70.

8. The method of claim 7 further comprising feeding the dewaxed diesel stream into an aromatics removal reactor or a stacked catalyst bed to produce the one or more petroleum distillate streams of step (e).

9. The method of claim 7, wherein the crude oil is tight oil, Permian crude oil or shale oil.

10. The method of claim 7, wherein the crude oil has a paraffins content ranging from about 20 to about 80 wt %.

11. The method of claim 7, wherein the crude oil has a naphthenes content ranging from about 20 to about 60 wt %.

12. The method of claim 7, wherein the crude oil has an aromatics content ranging from about 5 to about 50 wt %.

13. The method of claim 7, wherein the crude oil has an aliphatic sulfur content ranging from about 20 to about 70 ppm.

14. The method of claim 7, wherein the crude oil has a nitrogen content ranging from about 5 to about 800 ppm.

15. The method of claim 7, wherein the crude oil has a basic nitrogen content ranging from about 5 to about 20 ppm.

16. The method of claim 5, wherein the one or more petroleum distillate streams is a high paraffinic diesel product.

17. The method of claim 7 wherein the high paraffinic diesel product has a sulfur content of less than 5 ppm.

18. The method of claim 7 wherein the high paraffinic diesel product has a total aromatics content of less than or equal to 1.1 weight percent.

19. The method of claim 7 wherein the high paraffinic diesel product has a carbon residue content of less than or equal to 0.3 weight percent.

20. The method of claim 7 wherein the high paraffinic diesel product has a Cetane number greater than or equal to 70.

21. The method of method of claim 16 wherein the high paraffinic diesel product has a Cetane Index greater than or equal to 70.

22. The method of claim 16 wherein the petroleum distillate has a total aromatics content of less than 1 weight percent.

23. The method of claim 7, wherein the diesel stream comprises the diesel and kerosene streams from the distillation tower.

24. A process for preparing a high paraffinic diesel product, the method comprising:
    (a) blending a petroleum distillate stream and a petroleum distillate stream from either claim 1, 5, 6 or 8;
    (b) processing the blended diesel stream using an aromatic removal process to lower the aromatics content;
    (c) optionally processing the stream using a hydrotreatment process or de-waxing process and
    (d) processing the diesel stream to create a high paraffinic diesel product.

* * * * *